US011642591B2

(12) United States Patent
Kuwatani et al.

(10) Patent No.: US 11,642,591 B2
(45) Date of Patent: *May 9, 2023

(54) GAME PROCESSING SYSTEM, METHOD OF PROCESSING GAME, AND STORAGE MEDIUM STORING PROGRAM FOR PROCESSING GAME

(71) Applicant: Gree, Inc., Tokyo (JP)

(72) Inventors: Takashi Kuwatani, Tokyo (JP); Makoto Chida, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,442

(22) Filed: Jul. 1, 2021

(65) Prior Publication Data

US 2021/0322868 A1 Oct. 21, 2021

Related U.S. Application Data

(63) Continuation of application No. 16/268,756, filed on Feb. 6, 2019, now Pat. No. 11,083,959.

(30) Foreign Application Priority Data

Feb. 6, 2018 (JP) .............................. JP2018-019003
Nov. 21, 2018 (JP) .............................. JP2018-218087

(51) Int. Cl.
 *A63F 13/26* (2014.01)
 *A63F 13/69* (2014.01)
(52) U.S. Cl.
 CPC .............. *A63F 13/26* (2014.09); *A63F 13/69* (2014.09); *A63F 2300/8082* (2013.01)

(58) Field of Classification Search
 CPC ... A63F 13/26; A63F 13/69; A63F 2300/8082
 See application file for complete search history.

(56) References Cited

U.S. PATENT DOCUMENTS 5,791,987 A * 8/1998 Chen .................... A63F 3/00643
 273/281
5,835,077 A * 11/1998 Dao ........................ G01P 15/18
 345/157

(Continued)

OTHER PUBLICATIONS

Notice of Reasons for Refusal dated Jul. 26, 2022, issued in corresponding Japanese Patent Application No. 2021-109780 with English translation (7 pgs.).

*Primary Examiner* — David L Lewis
*Assistant Examiner* — Matthew D Hoel
(74) *Attorney, Agent, or Firm* — Pillsbury Winthrop Shaw Pittman, LLP

(57) ABSTRACT

A game processing system according to an aspect is a game processing system for processing a game having a first mode and a second mode, the system comprising: a storage storing a game parameter relating to the game; and one or more computer processors. The one or more computer processors execute computer-readable instructions to: provide, in the first mode, an interaction with a virtual character in accordance with first detection information obtained by an information processing device not mounted on a head of a player; provide, in the second mode, an interaction with the virtual character in accordance with second detection information obtained by a head mounted display mounted on the head of the player; and update the game parameter in accordance with progress of the game in the first mode and the second mode.

15 Claims, 17 Drawing Sheets

(56) References Cited

U.S. PATENT DOCUMENTS

| | | | | |
|---|---|---|---|---|
| 5,927,714 A * | 7/1999 | Kaplan | G07F 17/34 | 463/20 |
| 6,213,873 B1 * | 4/2001 | Gasper | A63F 3/00643 | 345/473 |
| 6,254,098 B1 * | 7/2001 | Kirkpatrick | A63F 3/00643 | 273/271 |
| 6,585,264 B2 * | 7/2003 | Benett | A63F 3/00157 | 273/138.2 |
| 6,916,247 B2 * | 7/2005 | Gatto | G07F 17/32 | 463/29 |
| 7,410,418 B2 * | 8/2008 | Potter | G07F 17/3295 | 463/14 |
| 7,497,439 B2 * | 3/2009 | Leupp | G07F 17/34 | 273/138.1 |
| 7,549,924 B2 * | 6/2009 | Canessa | H04L 51/04 | 463/40 |
| 7,664,816 B2 * | 2/2010 | Heron | H04L 12/1818 | 709/204 |
| 7,828,661 B1 * | 11/2010 | Fish | A63F 13/795 | 709/204 |
| 8,025,570 B2 * | 9/2011 | Labrie | A63F 13/80 | 463/42 |
| 8,087,672 B2 * | 1/2012 | Malobabic | G07F 17/3276 | 273/238 |
| 8,109,820 B2 * | 2/2012 | Nagel | A63F 3/022 | 707/804 |
| 8,250,476 B2 * | 8/2012 | Hamilton, II | A63F 13/63 | 715/753 |
| 8,271,962 B2 * | 9/2012 | Muller | G06F 40/166 | 717/169 |
| 8,272,961 B2 * | 9/2012 | Busey | A63F 13/63 | 463/31 |
| 8,282,458 B2 * | 10/2012 | Reynolds | A63F 13/497 | 463/40 |
| 8,303,416 B1 * | 11/2012 | Thakkar | G06F 3/048 | 463/42 |
| 8,328,644 B2 * | 12/2012 | Busey | A63F 13/58 | 463/31 |
| 8,342,967 B2 * | 1/2013 | Thakkar | A63F 13/795 | 715/758 |
| 8,348,765 B1 * | 1/2013 | Thakkar | A63F 13/795 | 715/758 |
| 8,357,405 B2 * | 1/2013 | Schmitz | A61K 36/736 | 424/775 |
| 8,366,546 B1 * | 2/2013 | Naik | A63F 13/335 | 463/31 |
| 8,379,540 B2 * | 2/2013 | Gill | A63F 13/31 | 370/254 |
| 8,535,134 B2 * | 9/2013 | Katz | G07F 17/3272 | 463/31 |
| 8,579,108 B2 * | 11/2013 | Tanbo | B65D 77/02 | 229/87.13 |
| 8,602,875 B2 * | 12/2013 | Nguyen | G07F 17/3288 | 463/19 |
| 8,622,828 B1 * | 1/2014 | Harrington | A63F 13/46 | 463/31 |
| 8,636,583 B2 * | 1/2014 | Bigelow, Jr. | G07F 17/32 | 463/40 |
| 8,734,243 B2 * | 5/2014 | Harrington | A63F 13/79 | 463/29 |
| 8,754,905 B2 * | 6/2014 | Mahajan | A63F 13/30 | 463/31 |
| 8,799,810 B1 * | 8/2014 | Wheeler | G06F 3/012 | 348/208.99 |
| 8,821,297 B1 * | 9/2014 | Nagata | H04L 51/046 | 463/29 |
| 8,834,277 B2 * | 9/2014 | Perry | A63F 13/21 | 463/43 |
| 8,894,484 B2 * | 11/2014 | Latta | A63F 13/65 | 463/36 |
| 8,986,116 B1 * | 3/2015 | Harrington | G06Q 50/01 | 463/29 |
| 9,168,454 B2 * | 10/2015 | Manning | G07F 17/32 | |
| 9,295,914 B2 * | 3/2016 | Almog | A63F 13/335 | |
| 9,305,328 B2 * | 4/2016 | Mahajan | G06T 11/60 | |
| 9,415,305 B2 * | 8/2016 | Cudak | A63F 13/67 | |
| 9,486,709 B1 * | 11/2016 | Lan | A63F 13/79 | |
| 9,533,217 B2 * | 1/2017 | Naik | G06Q 10/101 | |
| 9,536,374 B2 * | 1/2017 | Manning | G07F 17/3237 | |
| 9,586,139 B2 * | 3/2017 | Jabara | H04W 8/186 | |
| 9,682,315 B1 * | 6/2017 | Miller | A63F 13/795 | |
| 9,682,324 B2 * | 6/2017 | Bansi | A63F 13/795 | |
| 9,703,369 B1 * | 7/2017 | Mullen | A63F 13/843 | |
| 9,744,448 B2 * | 8/2017 | Mullen | A63F 13/327 | |
| 9,746,921 B2 * | 8/2017 | Mallinson | G06F 3/016 | |
| 9,746,984 B2 * | 8/2017 | Stafford | A63F 13/28 | |
| 9,811,979 B2 * | 11/2017 | Ma | G07F 17/3293 | |
| 9,895,609 B2 * | 2/2018 | Miller | A63F 13/795 | |
| 9,901,816 B2 * | 2/2018 | Lee | A63F 13/212 | |
| 9,950,258 B2 * | 4/2018 | Inomata | A63F 13/212 | |
| 9,968,849 B1 * | 5/2018 | Lan | A63F 13/79 | |
| 9,987,554 B2 * | 6/2018 | Stafford | G06F 3/017 | |
| 10,115,238 B2 * | 10/2018 | Chen | G06Q 30/0267 | |
| 10,231,612 B2 * | 3/2019 | Nacouzi | A61B 1/00101 | |
| 10,341,612 B2 * | 7/2019 | Imaoka | G06Q 30/06 | |
| 10,518,172 B2 * | 12/2019 | Chen | A63F 13/212 | |
| 10,981,052 B2 * | 4/2021 | Kuwatani | G06F 3/012 | |
| 10,981,067 B2 * | 4/2021 | Kuwatani | A63F 13/87 | |
| 10,983,590 B2 * | 4/2021 | Kuwatani | G06F 3/017 | |
| 11,083,959 B2 * | 8/2021 | Kuwatani | A63F 13/212 | |
| 11,090,557 B2 * | 8/2021 | Downs | A63F 13/26 | |
| 11,110,346 B2 * | 9/2021 | Kuwatani | A63F 13/26 | |
| 11,123,638 B2 * | 9/2021 | Kitazono | A63F 13/822 | |
| 11,161,047 B2 * | 11/2021 | Kuwatani | A63F 13/87 | |
| 11,167,214 B1 * | 11/2021 | White | G06N 3/006 | |
| 11,247,128 B2 * | 2/2022 | Wu | A63F 13/822 | |
| 11,338,203 B2 * | 5/2022 | Lan | A63F 13/795 | |
| 2002/0086732 A1 * | 7/2002 | Kirmse | A63F 13/795 | 463/42 |
| 2005/0086301 A1 * | 4/2005 | Eichler | H04L 12/1822 | 709/204 |
| 2005/0266925 A1 * | 12/2005 | Hornell | A63F 13/5375 | 463/42 |
| 2006/0030959 A1 * | 2/2006 | Duhamel | G07F 17/3276 | 700/91 |
| 2006/0258463 A1 * | 11/2006 | Cugno | A63F 13/795 | 463/42 |
| 2007/0218997 A1 * | 9/2007 | Cho | A63F 13/795 | 463/42 |
| 2007/0220108 A1 * | 9/2007 | Whitaker | H04M 1/6041 | 709/217 |
| 2009/0149248 A1 * | 6/2009 | Busey | A63F 13/58 | 463/43 |
| 2009/0181767 A1 * | 7/2009 | Feng | A63F 13/12 | 463/29 |
| 2009/0208181 A1 * | 8/2009 | Cottrell | A63F 13/497 | 386/278 |
| 2009/0240659 A1 * | 9/2009 | Ganz | H04L 51/52 | |
| 2009/0243218 A1 * | 10/2009 | Schlumbrecht | A63F 3/00157 | 273/292 |
| 2009/0297118 A1 * | 12/2009 | Fink | H04N 21/4781 | 463/31 |
| 2010/0035685 A1 * | 2/2010 | Cha | A63F 13/2145 | 463/43 |
| 2010/0160038 A1 * | 6/2010 | Youm | A63F 13/10 | 463/29 |
| 2010/0182340 A1 * | 7/2010 | Bachelder | G02B 27/017 | 345/633 |
| 2011/0028208 A1 * | 2/2011 | Hodgetts | A63F 13/73 | 463/29 |
| 2011/0035684 A1 * | 2/2011 | Lewis | A63F 13/335 | 715/753 |
| 2011/0087967 A1 * | 4/2011 | Ganz | H04L 67/131 | 715/753 |
| 2012/0009997 A1 * | 1/2012 | Youm | A63F 13/335 | 463/42 |
| 2012/0013622 A1 * | 1/2012 | Mahajan | A63F 13/30 | 345/501 |

(56) References Cited

U.S. PATENT DOCUMENTS

| | | | | |
|---|---|---|---|---|
| 2012/0110455 A1* | 5/2012 | Sharma | G06F 3/0481 | 715/719 |
| 2012/0134651 A1* | 5/2012 | Cottrell | G11B 27/034 | 386/278 |
| 2012/0178536 A1* | 7/2012 | Oh | H04L 51/046 | 463/42 |
| 2012/0278739 A1* | 11/2012 | McClarren | A63F 13/35 | 715/757 |
| 2013/0156137 A1* | 6/2013 | Higuchi | H04B 1/16 | 375/340 |
| 2013/0219299 A1* | 8/2013 | Yerli | G06F 16/958 | 715/753 |
| 2013/0316820 A1* | 11/2013 | Douglas | A63F 13/26 | 463/31 |
| 2014/0128147 A1* | 5/2014 | Yu Cheng | G07F 17/3279 | 463/25 |
| 2014/0187314 A1* | 7/2014 | Perry | A63F 13/21 | 463/29 |
| 2014/0187315 A1* | 7/2014 | Perry | A63F 13/32 | 463/29 |
| 2014/0194207 A1* | 7/2014 | Yim | G07F 17/3272 | 463/40 |
| 2014/0253568 A1* | 9/2014 | Mahajan | G06F 9/5027 | 345/522 |
| 2014/0361956 A1* | 12/2014 | Mikhailov | G02B 27/0179 | 345/8 |
| 2015/0182858 A1* | 7/2015 | Angelici | A63F 13/54 | 463/35 |
| 2015/0260474 A1* | 9/2015 | Rublowsky | A63F 13/837 | 434/16 |
| 2015/0279079 A1* | 10/2015 | Wieczorek | A63F 13/00 | 345/473 |
| 2016/0093108 A1* | 3/2016 | Mao | A63F 13/493 | 345/633 |
| 2016/0232738 A1* | 8/2016 | Daly | G07F 17/326 | |
| 2016/0246384 A1* | 8/2016 | Mullins | G06F 3/017 | |
| 2016/0271487 A1* | 9/2016 | Crouse | A63F 1/00 | |
| 2016/0287994 A1* | 10/2016 | Tamaoki | A63F 13/80 | |
| 2017/0007926 A1* | 1/2017 | Inomata | A63F 13/212 | |
| 2017/0076503 A1* | 3/2017 | Tamaoki | G06F 3/017 | |
| 2017/0092235 A1* | 3/2017 | Osman | G06F 3/16 | |
| 2017/0169658 A1* | 6/2017 | Froy | G07F 17/3206 | |
| 2017/0182414 A1* | 6/2017 | Oishi | A63F 13/5255 | |
| 2017/0269685 A1* | 9/2017 | Marks | A63F 13/533 | |
| 2018/0229127 A1* | 8/2018 | Nahari | A63F 13/67 | |
| 2018/0262717 A1* | 9/2018 | Imaoka | G06Q 50/10 | |
| 2019/0240570 A1* | 8/2019 | Kuwatani | A63F 13/5255 | |
| 2019/0240582 A1* | 8/2019 | Kuwatani | A63F 13/87 | |
| 2020/0330876 A1* | 10/2020 | Kuwatani | A63F 13/26 | |
| 2021/0362045 A1* | 11/2021 | Kuwatani | A63F 13/26 | |
| 2022/0016532 A1* | 1/2022 | Kuwatani | A63F 13/26 | |

* cited by examiner

GAME PROCESSING SYSTEM, METHOD OF PROCESSING GAME, AND STORAGE MEDIUM STORING PROGRAM FOR PROCESSING GAME

CROSS-REFERENCE TO RELATED APPLICATIONS

This application is a Continuation Application of U.S. Ser. No. 16/268,756 filed on Feb. 6, 2019, which claims the benefit of priority from Japanese Patent Application Serial No. 2018-019003 (filed on Feb. 6, 2018), Japanese Patent Application Serial No. 2018-218087 (filed on Nov. 21, 2018. The subject matter of each of the above applications is incorporated herein by reference in entirety.

TECHNICAL FIELD

The present disclosure relates to a game processing system for processing a game that provides interaction with a virtual character, a method of processing a game, and a storage medium storing a program for processing a game. More specifically, the present disclosure relates to a game processing system for processing a game, a method of processing a game, and a storage medium storing a program for processing a game, the game being capable of providing interaction with a virtual character in accordance with detection information obtained by a head mounted display.

BACKGROUND

Simulation games that provide interaction with a virtual character are known. An example of these simulation games is disclosed in Japanese Patent Application Publication No. 2012-055644 ("the '644 Publication").

Games providing such interaction with a virtual character may utilize a head mounted display (hereinafter may be referred to as "HMD") in order to enhance player's sense of immersion in the games. For example, known is a VR game in which a virtual space is displayed on an HMD, and a player wearing the HMD can interact with a virtual character appearing in the virtual space. The game "SUMMER LESSON" from BANDAI NAMCO Entertainment Co., Ltd. is known as this type of VR game (see "Summer Lesson", [online], retrieved on 12, Dec. 2017, Internet (URL: HYPERLINK "http://summer-lesson.bn-ent.net/" http://summer-lesson.bn-ent.net/)).

As disclosed in Japanese Patent Application Publication No. 2017-058969 ("the '969 Publication"), an HMD includes a tracking sensor for sensing the position and orientation of a head of a player. In VR games using an HMD, a viewpoint in a virtual space is set in accordance with detection information obtained by the tracking sensor, and an image of the virtual space as viewed from the viewpoint thus set is displayed on the HMD.

In the game "SUMMER LESSON," realized is a function of specifying an interaction with a virtual character depending on detection information obtained by a tracking sensor of the HMD and causing the player to experience the specified interaction.

For example, when the player wearing the HMD nods in response to a movement of an image of a virtual character displayed on the HMD, a motion of the player's head corresponding to the nodding is detected. Based on the detected motion of the head, an image of the virtual character that performs an action responding to the nodding of the player is displayed on the HMD.

In this way, a conventional VR game in which interaction with a virtual character is performed using the HMD, an image of a virtual space is displayed so as to follow a motion of a player's head, and the player experiences interaction with the virtual character in accordance with the motion of the head so that the player can obtain a strong sense of immersion.

To play a VR game, a player needs to wear an HMD on his/her head. The HMD worn by the user blocks the view of the player in the actual world, and therefore, the VR game can be played in limited places and times.

SUMMARY

It is an object of the present disclosure to provide a technical improvement which solves or alleviates at least part of the drawbacks of the prior art mentioned above.

A game processing system according to an aspect is a game processing system for processing a game having a first mode and a second mode, the system comprising: a storage storing a game parameter relating to the game; and one or more computer processors. The one or more computer processors execute computer-readable instructions to: provide, in the first mode, an interaction with a virtual character in accordance with first detection information obtained by an information processing device not mounted on a head of a player; provide, in the second mode, an interaction with the virtual character in accordance with second detection information obtained by a head mounted display mounted on the head of the player; and update the game parameter in accordance with progress of the game in the first mode and the second mode.

In the game processing system according to an aspect, an action of the virtual character in the second mode is determined in accordance with the game parameter.

In the game processing system according to an aspect, the storage stores scene data relating to each of a plurality of game scenes constituting a game scenario in the second mode, and the one or more computer processors select a scene to be executed in the second mode from the plurality of game scenes in accordance with the game parameter.

In the game processing system according to an aspect, the one or more computer processors update the game parameter when the second mode is terminated abnormally.

In the game processing system according to an aspect, the one or more computer processors performs a switch process to switch from the first mode to the second mode such that a value of the game parameter as of an end of the first mode is equal to a value of the game parameter as of a start of the second mode.

A method of processing a game according to an aspect is a method of processing a game having a first mode and a second mode with one or more computer processors executing computer-readable instructions, the method comprising: providing, in the first mode, an interaction with a virtual character in accordance with first detection information obtained by an information processing device not mounted on a head of a player; providing, in the second mode, an interaction with the virtual character in accordance with second detection information obtained by a head mounted display mounted on the head of the player; and updating a game parameter relating to the game in accordance with progress of the game in the first mode and the second mode.

A game processing program according to an aspect stored in a non-transitory computer-readable storage medium is executed by one or more computer processors for processing a game having a first mode and a second mode. The game processing program causes the one or more computer processors to: provide, in the first mode, an interaction with a virtual character in accordance with first detection information obtained by an information processing device not mounted on a head of a player; provide, in the second mode, an interaction with the virtual character in accordance with second detection information obtained by a head mounted display mounted on the head of the player; and update a game parameter relating to the game in accordance with progress of the game in the first mode and the second mode.

Advantages

According to one aspect of the present disclosure, a game can be played in a first mode when the HMD is not usable.

DESCRIPTION OF THE EMBODIMENTS

Figure 1:
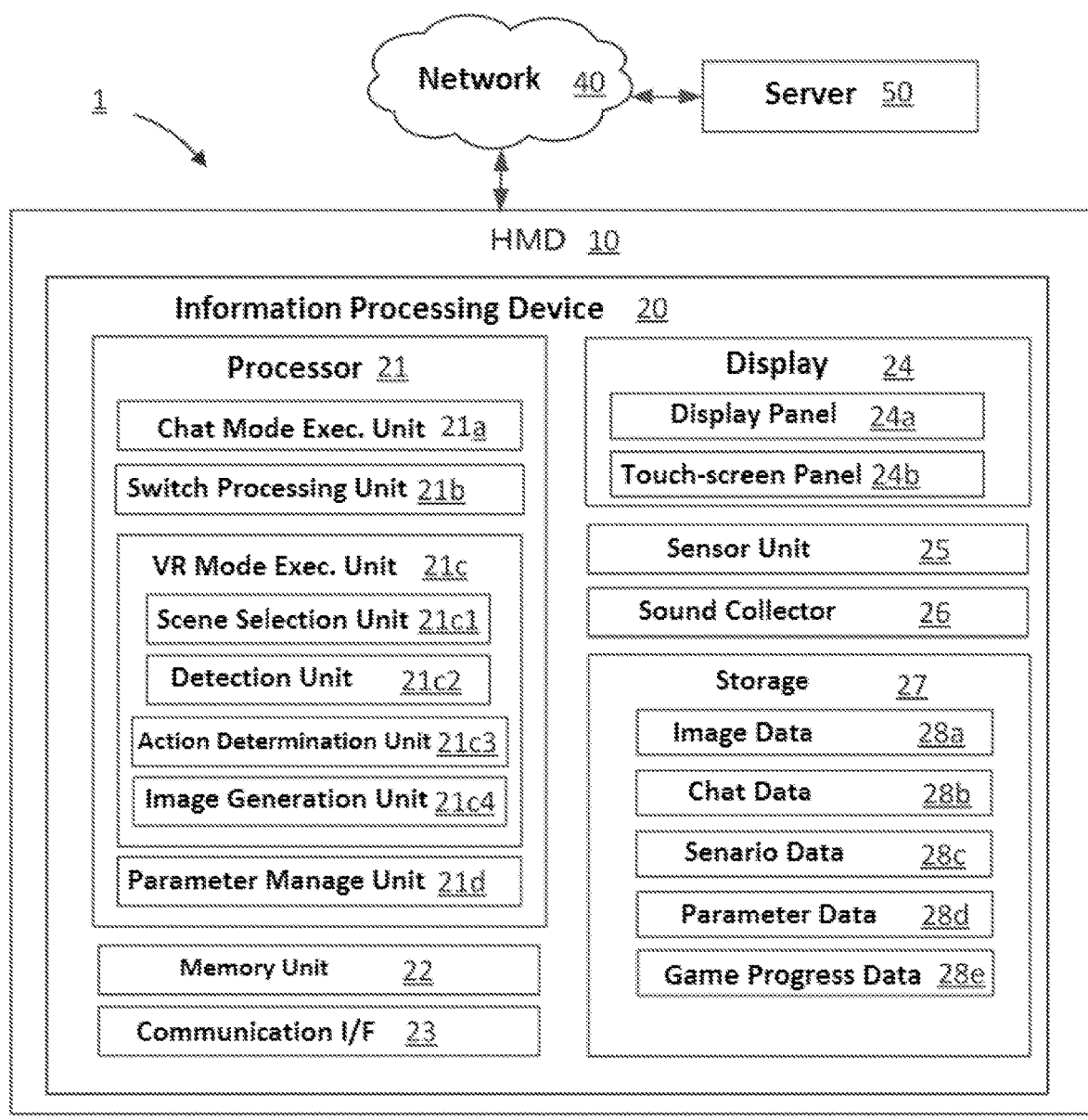
FIG. 1 is a block diagram illustrating a game processing system according to an embodiment.

Various embodiments of the disclosure will be described hereinafter with reference to the accompanying drawings. Throughout the drawings, the same or similar components are denoted by the same reference numerals.

Figure 2:
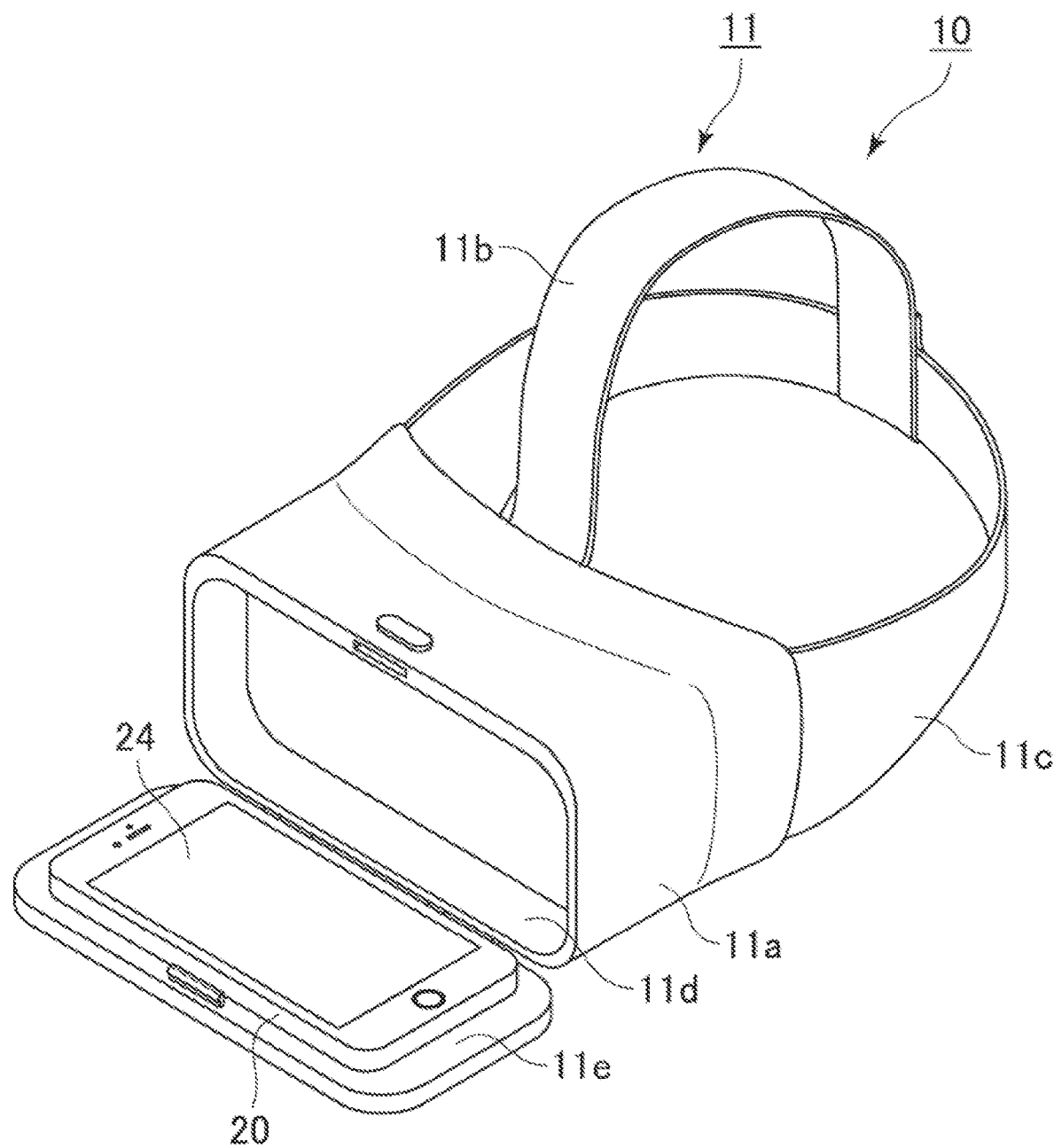
FIG. 2 is a schematic diagram showing a head mounted display usable in the game processing system of FIG. 1.
Figure 3:
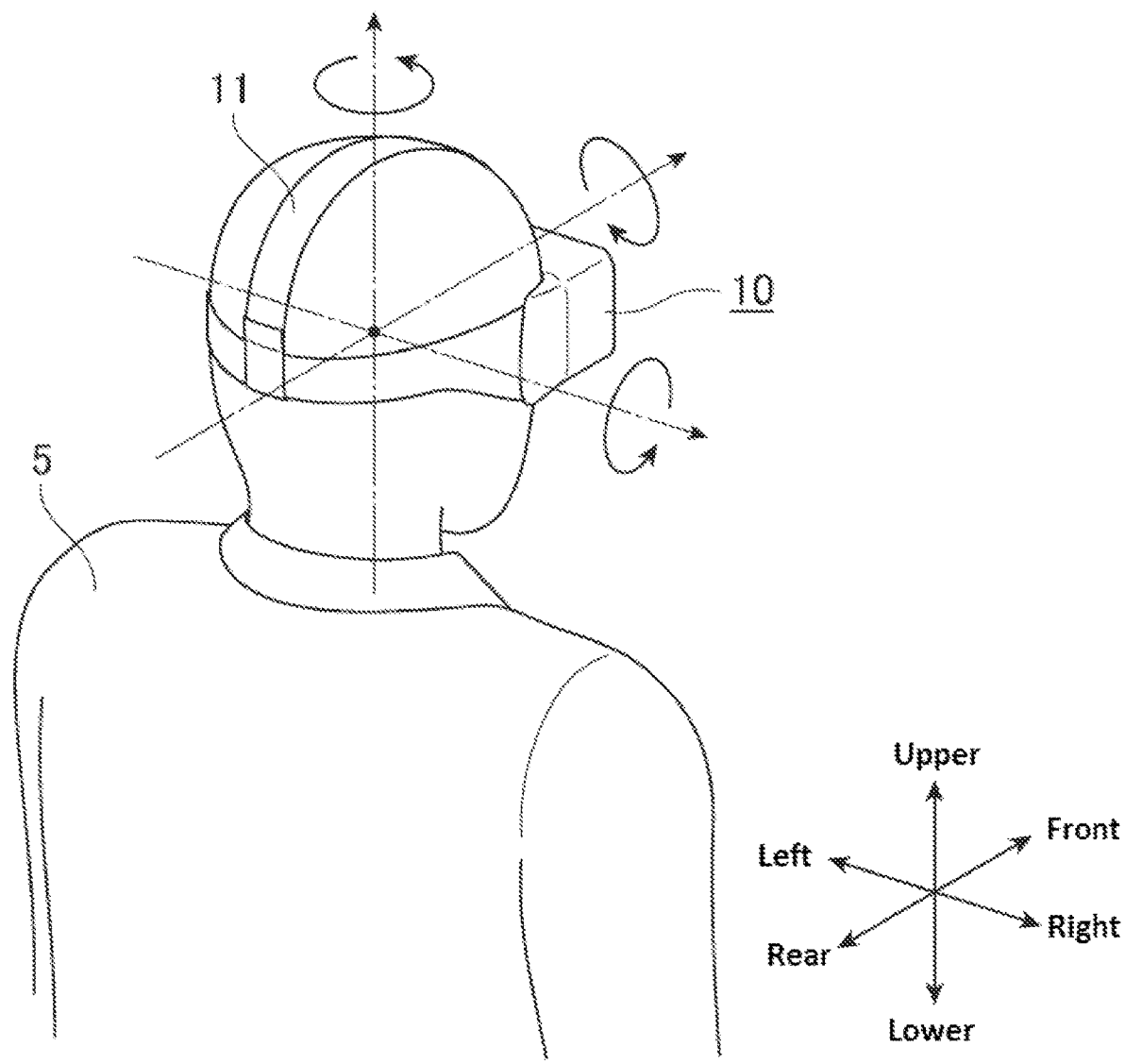
FIG. 3 is a diagram schematically showing the head mounted display worn by a player of the game.

With reference to FIGS. 1 to 3, a game processing system according to an embodiment of the disclosure will be described. FIG. 1 is a block diagram of a game processing system 1 according to an embodiment, FIG. 2 schematically illustrates a head mounted display 10 (hereinafter referred to as "HMD 10") used in the game processing system 1, and FIG. 3 schematically illustrates the HMD 10 worn by a player 5.

The game processing system 1 according to an embodiment realizes various games by executing game processing programs according to an embodiment. Using the game processing system 1, the player is able to play various games. For example, the game processing system 1 can realize a game in which a virtual character and the player interact in a virtual space. The game realized by the game processing system 1 has a first mode and a second mode. The game realized by the game processing system 1 includes a switch process to switch to the second mode. The same game contents are used in the first mode and the second mode. Game contents are electronic data that are used in a game and can be acquired, owned, used, managed, exchanged, integrated, reinforced, sold, abandoned, or donated in the game by users. The game contents include any content such as a card, an item, a virtual currency, a ticket, a character, an avatar, level information, status information, parameter information (health, attack, and the like), and statistic information (skills, abilities, magic, jobs and the like). However, the way the game contents are used may not be limited to those described in this specification. An example of the first mode is a chat mode, and an example of the second mode is a VR mode. The first mode and the second mode will be described later.

The game processing system 1 includes the HMD 10 and a server 50. The HMD 10 and the server 50 are communicably interconnected over a network 40.

As shown in FIG. 2, the HMD 10 includes an attachment 11 that is to be fitted on a human head and an information processing device 20 attached to the attachment 11.

The attachment 11 includes a goggle-like casing 11a having an opening 11d formed therein, a first belt 11b and a second belt 11c attached to the casing 11a, and a cover 11e. The cover 11e is attached to the casing 11a such that it is openable and closable. An opening 11d is formed in a front portion of the casing 11a. FIG. 2 shows the state where the cover 11e is open. When the HMD 10 is used, the cover 11e is closed so as to close the opening 11d.

The information processing device 20 is detachably provided on an inner side of the cover 11e of the HMD 10. The information processing device 20 includes a display 24. The information processing device 20 is attached to the cover 11e such that the display 24 faces the inside of the casing 11a when the cover 11e is closed. The information processing device 20 is attached to the attachment 11 when the HMD 10 is used. When the HMD 10 is not used, the information processing device 20 is detached from the attachment 11.

In the illustrated embodiment, the information processing device 20 is a smartphone. In addition to the smartphone, the information processing device 20 may be a mobile phone, a tablet, a personal computer, an electronic book reader, a wearable computer, a game console, or any other information processing devices. The information processing device 20 detached from the HMD 10 is operated by the player 5 in the first mode as described later. In addition to games, the information processing device 20 detached from the HMD 10 may be used for telephone calls and Internet accesses depending on its originally intended use.

The information processing device 20 includes the display 24 as described above. In the illustrated embodiment, when the information processing device 20 is mounted on the attachment 11, the display 24 serves as an apparatus for displaying an image in the HMD 10. Accordingly, when the HMD 10 is used to play a game, the display 24 displays a virtual space and a virtual character(s) of the game, and other images related to the game.

The shape of the attachment 11 is not limited to the illustrated goggle type. The attachment 11 may include a structure of any shape that moves following the movement of the head of the player who wears the HMD, and the structure can place the display 24 in front of the wearer's eye(s) while the HMD is worn. For example, the attachment 11 may have an eyeglasses-like shape, a hat-like shape, or a helmet-like shape. In order to enhance player's sense of immersion, the HMD 10 may be configured such that the display 24 covers both eyes of the player when the attachment 11 is attached to the head of the player.

When the HMD 10 is used, the HMD 10 is mounted on the head of the player 5 via the attachment 11, as shown in FIG. 3. The information processing device 20 is mounted on the attachment 11 attached to the head of the player 5.

The information processing device 20 will be further described referring again to FIG. 1. As illustrated, in one embodiment, the information processing device 20 includes a computer processor 21, a memory unit 22, a communication I/F 23, a display 24, a sensor unit 25, a sound collector 26, and a storage 27.

The computer processor 21 is a computing device which loads various programs realizing an operating system and game logics from the storage 27 or other storage into the memory unit 22 and executes instructions included in the loaded programs. The computer processor 21 is, for example, a CPU, an MPU, a DSP, a GPU, any other computing device, or a combination thereof. The processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or executed by a plurality of computer processors distributively. Further, a program or instructions included in the program executed by the computer processor 21 may be executed by a plurality of virtual computer processors.

The memory unit 22 is used to store instructions that may be executed by the computer processor 21 and other various data. At least a part of the game processing program in the embodiment is loaded into the memory unit 22 at appropriate timings in accordance with the progress of the game. The memory unit 22 is, for example, a main storage device (main memory) that the computer processor 21 is able to access at high speed. The memory unit 22 may be, for example, a RAM such as a DRAM or an SRAM.

The communication I/F 23 may be implemented as hardware, firmware, or communication software such as a TCP/IP driver or a PPP driver, or a combination thereof. The information processing device 20 is able to transmit and receive data to and from other devices via the communication I/F 23.

The display 24 includes a display panel 24a and a touch-screen panel 24b. For example, the display panel 24a is laminated on an upper surface or lower surface thereof with the touch-screen panel 24b. The display panel 24a is a liquid crystal panel, an organic EL panel, an inorganic EL panel, or any other display panel capable of displaying an image. The touch-screen panel 24b is configured to detect touch interactions (touch operations) performed by the player. The touch-screen panel 24b can detect various touch operations such as tapping, double tapping, and dragging performed by the player. The touch-screen panel 24b may include a capacitive proximity sensor and may be capable of detecting a non-contact operation performed by the player.

The sensor unit 25 includes one or more sensors. The sensor unit 25 includes, for example, at least one selected from the group consisting of a gyro sensor, an acceleration sensor, and a geomagnetic sensor. The sensor unit 25 may include an eye tracking sensor that directly detects player's eye movements. The eye tracking sensor is, for example, an eye-gaze tracking sensor that emits a near-infrared light beam into the iris and detects its reflected light. The position and the direction of the head of the player 5 wearing the HMD 10 are specified based on detection information obtained by the sensor unit 25 as described later.

The sound collector 26 is capable of collecting sound and voice. The sound collector 26 is, for example, a microphone. Sound and voice of the player 5 is detected based on audio information collected by the sound collector 26.

The storage 27 is an external storage device accessed by the computer processor 21. The storage 27 is, for example, a magnetic disk, an optical disk, a semiconductor memory, or various other storage device capable of storing data. Various programs such as a game processing program are stored in the storage 27. The storage 27 may also store various data used in a game(s). At least some of the programs and various data that can be stored in the storage 27 may be stored in a storage that is physically separated from the information processing device 20.

In the illustrated embodiment, the storage 27 stores image data 28a, chat data 28b, scenario data 28c, parameter data 28d, game progress data 28e, and various other data necessary for progress of the game.

The image data 28a includes data for drawing a background in a virtual space where a game is executed, data for drawing a virtual character, and data for drawing an object other than the virtual character used in the game. The image data 28a may include information about the position of an object in the virtual space.

The chat data 28b includes data for drawing an icon of a virtual character, data for drawing an icon of the player 5, data for specifying a plurality of messages from a virtual character, data representing options of a response message to the plurality of messages from the virtual character, and any other data used in the chat. The plurality of messages from the virtual character may be defined in a tree structure in which nodes corresponding to each message are interconnected by arcs. In the tree structure, for example, more than one arc extends from a start message which is the root node existing at the top, and each arc is connected to a node situated at a lower level. Arcs also extend from the lower nodes and are connected to nodes at a further lower level. The nodes at the lower levels each correspond to a possible message from a virtual character that may be displayed after the start message. The chat data 28b may include a mode switch condition that is a condition for starting a mode switch from the chat mode to the VR mode. The mode switch condition may include, for example, that the elapsed time since the game was started in the chat mode is equal to or longer than a predetermined length of time, that a chat has progressed to a terminal node of messages having the tree structure, and any other conditions. The chat data 28*b* may include data indicating a message that is to be displayed when the chat mode is resumed after selection of a switch object is not completed.

The scenario data 28*c* includes data defining a scenario experienced by the player 5 in the second mode (e.g., the VR mode) of the game. When there are two or more scenarios to be experienced by the player 5 in the game, the scenario data 28*c* may be defined for each of the scenarios.

Figure 4:
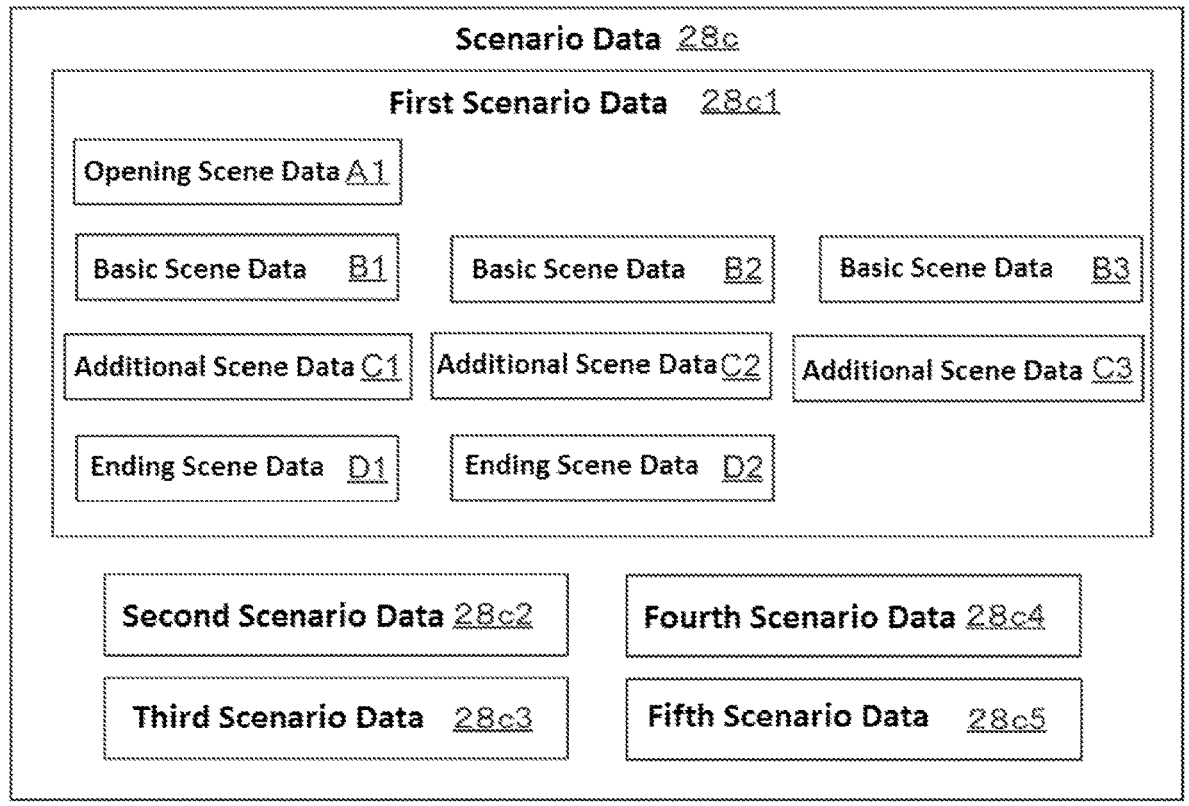
FIG. 4 schematically illustrates scenario data.

With reference to FIG. 4, scenario data used in the game processing system according to an embodiment will be described. FIG. 4 schematically shows the scenario data 28*c* used in the game processing system 1. The scenario data 28*c* is a data set for defining a scenario to be executed in the VR mode. In the illustrated embodiment, the scenario data 28*c* includes first scenario data 28*c*1 to fifth scenario data 28*c*5 corresponding to a first scenario to a fifth scenario, respectively. There may be six or more scenarios or may be four or less scenarios in the VR mode. Data structure of the first scenario data 28*c*1 corresponding to the first scenario will be now described. The description on the first scenario data 28*c*1 below also applies to the second scenario data 28*c*2 to the fifth scenario data 28*c*5.

In the illustrated embodiment, the first scenario data 28*c*1 includes opening scene data A1, basic scene data B1 to B3, additional scene data C1 to C3, and ending scene data D1 to D2. In one embodiment, the opening scene data A1, the basic scene data B1 to B3, the additional scene data C1 to C3, and the ending scene data D1 to D2 may each include data concerning actions of a virtual character in a corresponding scene, data concerning moving images used in the scene, data concerning actions that the player can do responsive to the virtual character in the scene, and any other data necessary for executing the scene.

In the illustrated embodiment, the opening scene data A1 includes data concerning an action of the virtual character in an opening scene executed after the first scenario has started, data concerning a moving image used in the opening scene, data concerning actions that the player can do responsive to the virtual character in the opening scene, and any other data necessary for executing the opening scene.

The basic scene data B1 to B3 include data relating to actions of the virtual character in basic scenes executed after the opening scene, data relating to a moving image used in the basic scene, data relating to actions that the player can make to the virtual character in the basic scene, and any other data necessary for executing the basic scene. The basic scene data B1 to B3 may each include information indicating conditions for switching to an additional scene to determine whether switching to the additional scene is possible or not. The condition for switching to the additional scene may be determined for each basic scene. The condition for switching to the addition scene is, for example, that the player gazes at a predetermined object for a predetermined period of time or longer, the player does not look fixedly at a predetermined direction, and the player does a prescribed action. Other than the above-mentioned ones, the conditions for switching to the addition scene can be appropriately determined depending on the story of a scenario, a type of an object appearing in the virtual space, and other factors.

The additional scene data C1 to C3 include data concerning actions of the virtual character in an additional scene, data concerning a moving image used in the additional scene, data concerning actions that the player can do responsive to the virtual character in the additional scene, and any other data necessary for executing the additional scene. It is determined whether the condition for switching to the additional scene is satisfied during or after the basic scene is executed, and then the additional scene is executed in accordance with the determination result.

The ending scene data D1 to D2 may include data necessary for executing an ending scene before the second mode is terminated. The ending scene data D1 to D2 include data concerning actions of the virtual character in the ending scene, data concerning a moving image used in the ending scene, data concerning actions that the player can do responsive to the virtual character in the ending scene, and any other data necessary for executing the ending scene.

The parameter data 28*d* includes a game parameter relating to a game realized in the game processing system 1. The game parameter may be a player character parameter relating to a player character. The player character parameter may include a parameter representing a virtual character's favorability to a user character. Here, the virtual character is a non-player character. The game parameter may be updated as the game progresses. The parameter relating to the player character is not limited to the parameter representing the virtual character's favorability to the user character. The parameter relating to the player character is appropriately determined according to a type, the nature, the worldview of the game, or other elements.

The game progress data 28*e* includes data used for managing the progress of the game. The game progress data 28*e* may be updated as the game progresses. The game progress data 28*e* may include, for example, data related to points acquired by the player in the game, and any other various types of data that may vary depending on the progress of the game.

The components and functions of the information processing device 20 shown in FIG. 1 are examples. The information processing device 20 applicable to the invention may include various components that are not shown. For example, the information processing device 20 may be provided with a speaker for outputting sound effect of the game and sound and voice of the virtual character.

Next, functions of the HMD 10 will be described. In the illustrated embodiment, various functions of the HMD 10 are realized by the computer processor 21 of the information processing device 20 executing computer readable instructions. The instructions executed by the computer processor 21 include instructions included in the game processing program according to an embodiment.

When the game processing program according to the embodiment is executed by the computer processor 21, the game having the first mode and the second mode different from the first mode is realized in the game processing system 1. The game realized in the game processing system 1 may further have a mode other than the first mode and the second mode.

In the first mode of the game realized in the game processing system 1, processing relating to the game is performed based on first detection information detected by the information processing device 20 when the HMD 10 is not mounted on the player 5, that is, when the information processing device 20 is detached from the attachment 11. The first detection information may include information concerning a touch operation of the player 5 detected via the touch-screen panel 24*b* of the information processing device 20, information concerning voice of the player detected by the sound collector 26, and any other detection information that can be detected in the information processing device 20 when the HMD 10 is not attached to the player 5. In the first mode, the player 5 is able to perform operations relating to the game using the information processing device 20 that is removed from the attachment 11. Since the first mode is designed to play the game when the HMD 10 is not mounted on the player 5, it is possible to display a non-stereoscopic image on the display 24.

In the second mode of the game realized in the game processing system 1, the game is played and progresses using second detection information detected by the HMD 10 attached to the head of the player 5. The second detection information is, for example, detection information obtained by the sensor unit 25. Based on the second detection information, head tracking information for determining the orientation of the head of the player 5 is calculated. The head tracking information may be information indicating the position of the head of the player 5 in addition to the orientation of the head of the player 5. A process for progressing the game in the second mode may be performed based on, for example, the head tracking information calculated based on the second detection information. The process for progressing the game in the second mode may be performed using any other information in addition to the head tracking information. In preparation for playing the game in the second mode, the player 5 attaches the information processing device 20 to the attachment 11, and places the attachment 11 with the information processing device 20 on his/her head. As described above, the second mode is designed such that the game is played while the HMD 10 is worn by the player 5, so in one embodiment, a stereoscopic image that is stereoscopically viewed by the player 5 is displayed on the display 24 in the second mode. The stereoscopic image is displayed on the display 24 by, for example, a parallax barrier method. In the parallax barrier method, a left eye image and a right eye image are displayed on the display 24. The stereoscopic image is a set of images including the left eye image and the right eye image configured to be stereoscopically viewed when displayed on the display utilizing the parallax of the left and right eyes.

The first mode is, for example, a chat mode. The chat mode is an example of the first mode. The chat mode provides a function that allows the player to chat with a virtual character via a text message. In the first mode, the player can experience interaction with a virtual character by chatting with the virtual character. Processes performed in the chat mode will be described later in detail. Here, the interaction means, in a broad sense, that the virtual character reacts to an action made by the player. The interaction with the virtual character includes an interaction performed as communication with the virtual character such as conversation with the virtual character. In this specification, an interaction performed as communication with a virtual character may also be referred to as a communicative interaction. In addition to the communicative interaction, the interaction with a virtual character may include a battle against the virtual character, a cooperative play to play the game in cooperation with the virtual character, and other interactions with a virtual character. In this specification, an interaction performed as a battle against a virtual character may be referred to as a battle interaction. In the specification, an interaction performed as a cooperative play with a virtual character may be referred to as a cooperative interaction.

The second mode is, for example, the VR mode. The VR mode provides a function that allows the player to perform various interactions with a virtual character, which is a non-player character appearing in the virtual space displayed on the display of the information processing 20. Processes performed in the VR mode will be described later in detail. The VR mode is an example of the second mode, and the second mode may include any game mode in which a process for progressing the game is performed using the head tracking information.

In one embodiment, a game having the first mode and the second mode that is realized by the game processing system 1, may be a game in which a player performs interactions with a virtual character other than the communicative interaction. In the game realized by the game processing system 1, the communicative interaction may not be performed. The game according to one embodiment is played in a two-dimensional space in the first mode and played in a three-dimensional space in the second mode. The game according to one embodiment is played in a three-dimensional space in the first mode, whereas in the second mode, the game is played in a three-dimensional space displayed in a different manner than the three-dimensional space of the first mode (or in a three-dimensional space configured in a different manner than the three-dimensional space of the first mode). In one embodiment, the game realized by the game processing system 1 may use a game content(s) common to the first mode and the second mode. A content parameter associated with the game content may be carried over to/from the first mode from/to the second mode. For example, when a value of the content parameter of the specific game content is changed during playing the game in the first mode and thereafter the game switches to the second mode, the specific game content with the changed content parameter is used in the second mode. In one embodiment, a value of a content parameter of a specific game content may be changed when the game is switched from the first mode to the second mode and/or when the game is switched from the second mode to the first mode. The change of the content parameter of the game content may be either advantageous for the player 5 to progress the game or disadvantageous for the player 5. In one embodiment, a game play result in the first mode may be reflected in the game played in the second mode, and a play result in the second mode may be reflected in the game played in the first mode. For example, experience points of the player 5 acquired in the first mode may be carried over to the second mode.

As described above, the first mode and the second mode of the game realized in the game processing system 1 are distinguished from each other. That is, the first mode is different from the second mode. In one embodiment, when the game implemented in the game processing system 1 is played in the first mode, the HMD 10 is not attached to the head of the player 5, whereas when the game is played in the second mode, the HMD 10 is attached to the head of the player 5. In the first mode, the game is processed based on the first detection information obtained by the information processing device 20 that is not attached to the head of the player 5, whereas in the second mode, the game is processed based on the second detection information obtained by the HMD 10 that is attached to the head of the player 5.

In one embodiment, a stereoscopic image is displayed on the display 24 in the second mode, whereas in the first mode, a non-stereoscopic image is displayed on the display 24 as described above. At least an image of a virtual character among the images used in the game is displayed as a stereoscopic image in the second mode, whereas in the first mode, the image of the virtual character is displayed as a non-stereoscopic image.

In one embodiment, a process of progressing the game in the first mode is performed without using the head tracking information calculated based on the second detection information, whereas in the second mode, a process of progressing the game is performed based on the head tracking information.

In one embodiment, the process of progressing the game in the first mode is performed in accordance with a touch operation detected via the touch-screen panel 24b, whereas in the second mode, the process is not performed in accordance with the touch operation on the touch-screen panel 24b.

In one embodiment, in the case where an interaction with a virtual character is provided in a game implemented in the game processing system 1, the interaction with the virtual character is provided based on the first detection information obtained by the information processing device 20 that is not attached to the head of the player 5 in the first mode. In the second mode, the interaction with the virtual character is provided based on the second detection information obtained by the HMD 10 attached to the head of the player 5.

Figure 5:
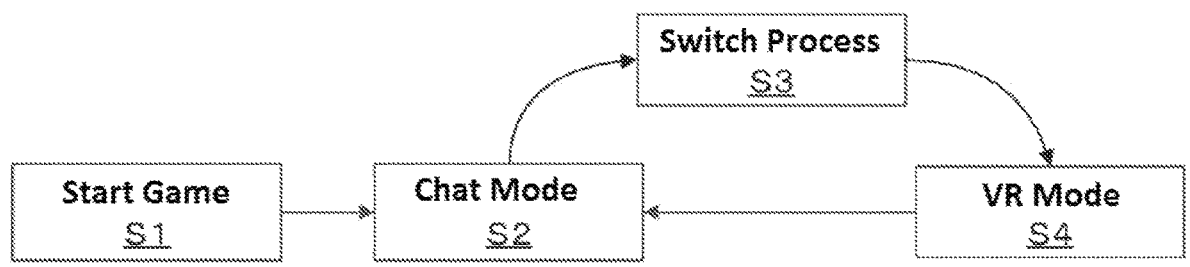
FIG. 5 is a diagram illustrating a mode switch in the game processed by the game processing system according to an embodiment.

After the game is started, it is possible to switch between the first mode and the second mode which are distinguished as described above. With reference to FIG. 5, the outline of the mode switch of the game processed by the game processing system 1 will be described. As shown, when the game is started in step S1, the chat mode, which is the first mode, is started in step S2. In this chat mode, upon start of a switching process for switching to the VR mode which is the second mode, the process shifts to step S3 and the switching process to the second mode is carried out. When the switching process is completed, the VR mode, which is the second mode, is started in step S4. When the VR mode is terminated or interrupted, a return process to the chat mode is performed.

Functions realized by the computer processor 21 will be now described more specifically. The computer processor 21 functions as a chat mode execution unit 21a, a switch processing unit 21b, a VR mode execution unit 21c, and a parameter management unit 21d by executing computer readable instructions included in the game processing program. At least some of the functions that can be realized by the computer processor 21 may be realized by a computer processor other than the computer processor 21 of the game system 1. For example, at least some of the functions realized by the computer processor 21 may be realized by a computer processor mounted on the server 50.

The chat mode execution unit 21a performs processing for providing the game in the chat mode as the first mode by executing a game processing program according to an embodiment. The chat mode executing unit 21a implements a function that allows the player 5 (or a character of the player 5) to chat with a virtual character that is the non-player character. After the player 5 logs in to the chat mode, the chat mode execution unit 21a displays a message from the virtual character and a message input or selected by the player 5 on the display 24, and enables the player 5 to chat with the virtual character. Following the message from the virtual character, the chat mode execution unit 21a may display on the display 24 several response options for the player 5 to respond to the message. One alternative is selected from the response alternatives according to an operation of the player 5 and a message corresponding to the selected response is displayed on the display 24 as a message from the player 5. The player 5 can select a desired one from the displayed response options by touching the touch-screen panel 24b. The message from the virtual character and the response options for the player to respond to the message can be specified by referring to the chat data 28b in accordance with the game processing program. The message from the virtual character may be displayed together with an image of the virtual character, and the message from the player 5 may be displayed together with an image of the player 5. The message from the virtual character may include a message for prompting the player to switch to the VR mode which is the second mode, a message for allowing the player 5 to select an option(s) for setting of the VR mode, and any other message associated with the VR mode.

In the chat mode, a switch start object for starting switching to the VR mode as the second mode is displayed in accordance with the progress of the chat. Display of the switch start object is performed in accordance with the game processing program when the mode switch condition is satisfied. The chat mode execution unit 21a is capable of detecting that the switch start object is selected based on a detection signal from the touch-screen panel 24b or any other user interface. When it is detected that the switch start object has been selected, the process for switching to the VR mode, which is the second mode, is started.

The switch processing unit 21b performs the process for switching from the first mode to the second mode. The switch process may include displaying a guidance on the display 24 to prompt a player to attach the information processing device 20 to the attachment 11, and displaying the switch object on the display 24 such that it is selectable by the player's gazing. After displaying the switch object, the switch processing unit 21b receives a detection signal from the sensor unit 25 or another sensor and determines whether the switch object has been selected by gazing based on the detection signal. For the determination, the switch processing unit 21b calculates the position and orientation of the HMD 10 based on the detection signal from the sensor unit 25, and specifies the position (point) at which the player 5 gazes based on the calculated position and orientation of the HMD 10. The gazing point can be specified by various known methods. For example, the gazing point may be specified based on the detection signal of the eye tracking sensor. For example, the switch processing unit 21b measures the duration of time (gazing duration) during which the gazing point is on the switch start object, and when the gazing duration reaches a predetermined length, the switch processing unit 21b determines that the selection of the switch start object has been completed. After the switch processing unit 21b determines that the selection of the switch object has been completed, it starts the VR mode which is the second mode.

The VR mode execution unit 21c displays an image of the virtual character in the virtual space in accordance with the game processing program and realizes interactions between the virtual character and the player 5. The VR mode execution unit 21c serves as a scene selection unit 21c1, a detection unit 21c2, an action determination unit 21c3, and an image generation unit 21c4 when the game processing program according to one embodiment is executed by the processor 21.

The scene selection unit 21c1 selects a game scene to be executed based on the scenario data 28c and other information as required. After logging in to the VR mode, the scene selection unit 21c1 selects the opening scene. After the opening scene is executed, the scene selection unit 21c1 selects a next scene to be executed based on the detection information provided by the HMD 10, information stored in the storage 27 (for example, the parameter data 28d), and, any other information as necessary.

The detection unit 21c2 calculates the head tracking information for determining the orientation and/or the position of the HMD 10 based on the detection signal from the sensor unit 25 of the HMD 10. The head tracking information is information indicating the orientation and/or the position of the HMD 10. The head tracking information is determined based on the detection information from the sensor unit 25. More specifically, the head tracking information is obtained such that the position and orientation of the HMD 10 mounted on the head are calculated as the position in the three-dimensional orthogonal coordinate system and the angle around each axis. The three-dimensional orthogonal coordinate system is, for example, an orthogonal coordinate system composed of a roll axis along the front-rear direction, a yaw axis along the vertical direction, and a pitch axis along the left-right direction. The detection unit 21c2 generates a virtual space depending on the determined position and/or orientation of the HMD 10 and outputs image information for depicting the virtual space to the display 24. For example, the detection unit 21c2 can calculate the gazing direction or the gazing point based on the position and/or the orientation of the HMD 10.

The action determination unit 21c3 determines an action of the player 5 using the HMD 10 based on the head tracking information. Moreover, the action determination unit 21c3 may specify an action (reaction) of the virtual character in the virtual space according to the determined action of the player 5. The actions of the player 5 wearing the HMD 10 include nodding, shaking his/her head, any other actions accompanied by motions of the head, and eye movements. The action of the player 5 that causes the virtual character to make a reaction may include the player's eye movement. Such eye movement can be detected by the eye tracking sensor included in the sensor unit 25.

The image generation unit 21c4 generates image information for a depicting area in the virtual space. The depicting area is determined by an angle of view or the like around the gazing point or gazing direction determined by the detection unit 21c2. Based on the image information generated in this way, the image for the depicting area of the virtual space is displayed on the display 24. For the generation of the image information, for example, the image data 28a, the scenario data 28c, the parameter data 28d, the game progress data 28e, and other data stored in the storage 27 may be used. When a virtual character appears in the depicting area, the image generation unit 21c4 generates image information of the virtual space including the virtual character performing the action specified by the action determination unit 21c3, and the image generated in this manner is rendered on the display 24 as a stereoscopic image. In this way, an image of the virtual space including the image of the virtual character performing the action specified in response to the action of the player 5 is displayed on the display 24. The image generation unit 21c4 may generate audio information corresponding to the action of the virtual character and the depicting area of the virtual space. The audio information is output to the speaker of the HMD 10.

As described above, a motion image in which a virtual character moves in the virtual space is displayed on the display 24 by the VR mode execution unit 21c, and voice and sound corresponding to the movement of the virtual character is output from the speaker. For example, when the virtual character speaks to the player 5, a motion image in which the head and mouth of the virtual character move is displayed on the display 24, and voice corresponding to words which the virtual character speaks is output from the speaker. In one embodiment, the player 5 interacts with the same virtual character in the VR mode and the chat mode.

For example, a virtual character appearing in the VR mode has the same name as a virtual character appearing in the chat mode, and they have common appearance such that they can be recognized as the same character. It should be noted that the image of the virtual character is displayed as a stereoscopic image in the VR mode, whereas the image of the virtual character is displayed as a non-stereoscopic image in the chat mode, so that the images of the virtual character are different between the VR mode and the chat mode. However, such difference in representation format does not affect the identity of virtual characters.

The parameter management unit 21d updates the parameter data 28d as the game progresses. When the game is provided in the first mode, the parameter management unit 21d updates the parameter data 28d according to the progress of the game in the first mode, and when the game is provided in the second mode, the parameter management unit 21d updates the parameter data 28d according to the progress of the game in the second mode.

In a case where the parameter data 28d includes a parameter indicating the virtual character's favorability to the user character, the parameter management unit 21d may increase or decrease the value of the parameter depending on an action of the player 5 in the first mode and the second mode. When the first mode is the chat mode, the amount (for example, increase amount or decrease amount) or rate (increase rate or decrease rate) of change of favorability for each option of the message presented to the player 5 in the chat mode may be defined. In this case, the parameter management unit 21d specifies the change amount or change rate of the favorability depending on the message option selected by the player 5, and updates the parameter data 28d based on the specified change amount or change rate of the favorability. In the VR mode, the change amount or the change rate of the favorability may be determined for each type of action that the player 5 makes. The parameter management unit 21d specifies the change amount or change rate of the favorability depending on the action of the player 5 and updates the parameter data 28d based on the specified change amount or change rate of the favorability.

When the second mode is the VR mode, an inappropriate action may be defined for the actions that the player 5 takes in the VR mode. The inappropriate actions may include player's moving his/her head with an acceleration equal to or greater than a predetermined value, glancing at the prohibited area in the virtual space, and repeating the same action for more than a predetermined number of times. In this specification, among actions that the player 5 does, actions other than the inappropriate actions may also be referred to as normal actions. When the inappropriate action is performed by the player 5, the parameter managing unit 21d updates the parameter data 28d so as to decrease the favorability. Whereas when the normal action is made by the player 5, the parameter management unit 21d updates the parameter data 28d so as to increases or decreases the favorability depending on the normal action.

When the game is being processed in the VR mode, the VR mode may incidentally end abnormally without going through the ending scene prepared in the VR mode. For example, when the power supply to the HMD 10 is lost or when a function of the system program force-quits the game processing program, the VR mode may be terminated abnormally. When the VR mode is abnormally terminated, the parameter management unit 21d updates the parameter data 28d so as to decrease the favorability.

A value of a game parameter included in the parameter data 28d may be changed when the game is switched from the first mode to the second mode and/or when the game is switched from the second mode to the first mode, and the parameter data 28*d* may be updated so as to reflect the change. The change of the game parameter during mode switch may be either advantageous for the player 5 to progress the game or disadvantageous for the player 5. When the parameter data 28*d* include a plurality of game parameters, only a part of the plurality of game parameters may be changed when the game is switched from the first mode to the second mode and/or when the game is switched from the second mode to the first mode. When the parameter data 28*d* include a plurality of game parameters, a change amount or a change rate is set for each of the plurality of game parameters, and each of the game parameters may be changed based on the change amount or the change rate set therefor when the game is switched from the first mode to the second mode and/or when the game is switched from the second mode to the first mode.

The parameter data 28*d* may include a common parameter that can be used in both the first mode and the second mode. The player character parameter may be a common parameter. A value of a common parameter may be either changed or not changed when the game is switched from the first mode to the second mode and/or when the game is switched from the second mode to the first mode. When a value of a common parameter is changed, the parameter data 28*d* is updated so as to reflect the change. The change of the common parameter during mode switch may be either advantageous for the player 5 to progress the game or disadvantageous for the player 5.

The parameter data 28*d* may include a first mode parameter that is used in the first mode but is not used in the second mode and a second mode parameter that is used in the second mode but is not used in the first mode. Both the first mode parameter and the second mode parameter are included in the game parameters. The first mode parameter and the second mode parameter may be associated with each other. For example, when the first mode parameter is changed in the first mode, the second mode parameter associated with the first mode parameter may be changed in accordance with the change of the first mode parameter. Conversely, when the second mode parameter is changed in the second mode, the first mode parameter associated with the second mode parameter may be changed in accordance with the change of the second mode parameter. When the first mode parameter and the second mode parameter are changed, the parameter data 28*d* may be updated so as to reflect the change. In one embodiment, one example of the first mode parameter is the virtual character's favorability to the user character used in the first mode (a first mode favorability), and one example of the second mode parameter is the virtual character's favorability to the user character used in the second mode (a second mode favorability). For example, when the first mode favorability rises in the first mode, the second mode favorability rises accordingly. In another embodiment, one example of the first mode parameter is the virtual character's favorability to the user character used in the first mode (a first mode favorability), and one example of the second mode parameter is a game parameter used in the second mode other than the favorability (for example, the attack power of the player character). In this way, the first mode parameter and the second mode parameter may be game parameters of the same type or game parameters of different types.

When a termination condition is satisfied, the VR mode execution unit 21*c* performs a termination process to terminate the VR mode. The termination condition may include, for example, that a predetermined duration of time (for example, one minute) has elapsed from the start of the VR mode, that an operation for termination has been detected, that the last event included in the scenario being executed in the VR mode has ended, and any other conditions. The termination process performed when the termination condition is satisfied may include, displaying, on the display 24, a guidance for prompting the player to remove the information processing device 20 from the attachment 11, and displaying a login screen to log in to the chat mode which is the first mode.

Figure 6:
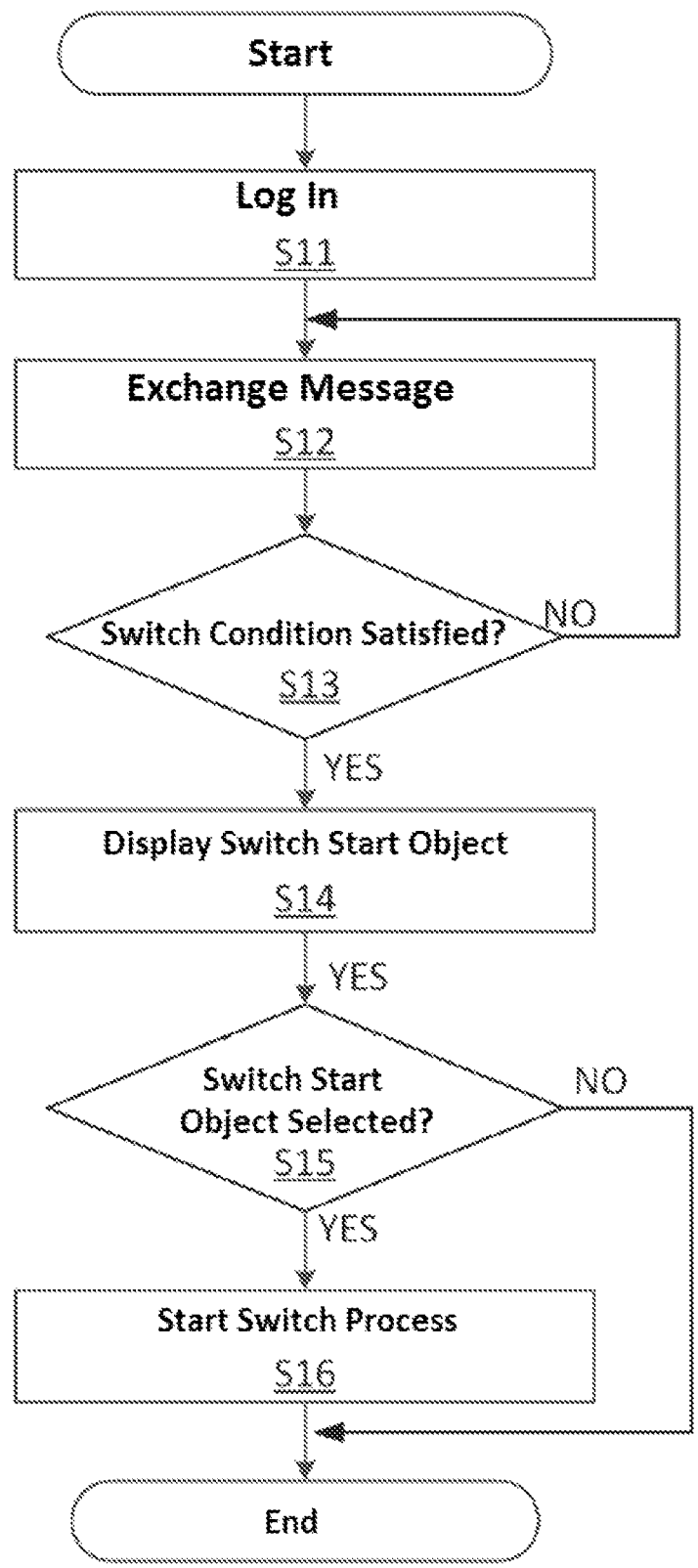
FIG. 6 is a flowchart of a process in a chat mode according to an embodiment.

Next, with reference to FIG. 6 and FIGS. 7*a* to 7*d*, a chat process in the chat mode will be described. FIG. 6 is a flowchart showing the flow of the process in the chat mode in one embodiment, and FIGS. 7*a* to 7*d* show examples of a display image in the chat mode. It is assumed that the HMD 10 is not mounted on the head of the player 5 and the information processing device 20 is detached from the attachment 11 at the start of the chat mode.

As described above, in the game processing system 1, the game is started in the chat mode. In step S11, a login screen for logging in to the chat mode is displayed on the display 24 of the information processing device 20. When the login process is performed by the player 5, the chat process proceeds to step S12.

Figure 7A:
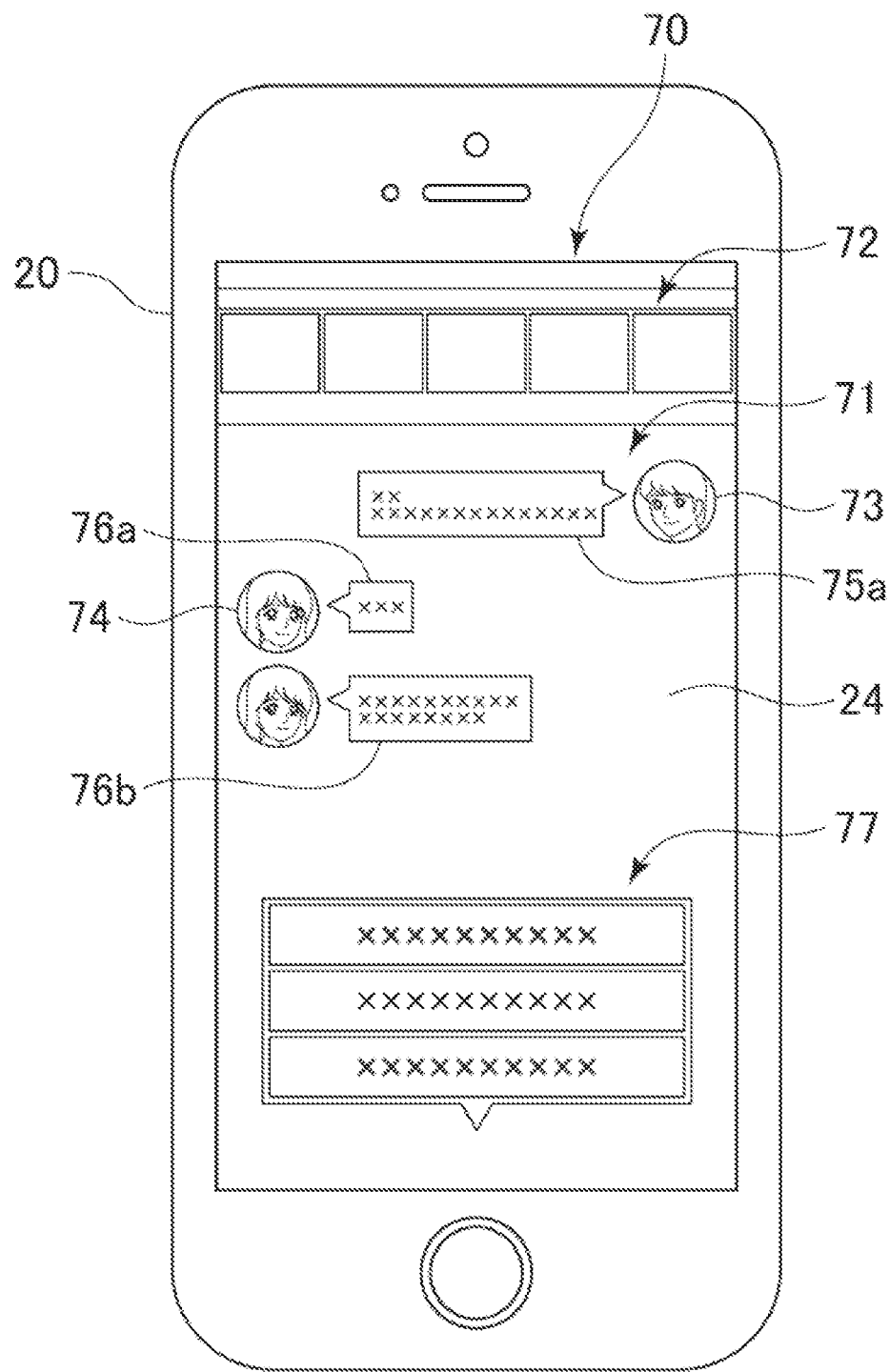
FIG. 7a shows an example of a display image in the chat mode according to an embodiment. The screen of FIG. 7a shows options of a message that the player is able to select.

In step S12, the player 5 and the virtual character exchange messages thereby to perform a chat therebetween. More specifically, after logging into the chat mode, a chat display image for displaying a chat performed between the player 5 and the virtual character is generated, and the chat display image is displayed on the display 24. FIG. 7*a* shows a chat display image 70 which is an example of the chat display image displayed on the display 24. The chat display image 70 has a chat display area 71 including an icon 73 corresponding to the player 5, an icon 74 corresponding to the virtual character, a message 75*a* from the player 5, and messages 76*a* and 76*b* from the virtual character. In addition, the chat display image 70 has a menu area 72 arranged at the top of the chat display area 71. The virtual character's messages 76*a* and 76*b* are specified based on the chat data 28*b* and other data stored in the storage 72 in accordance with the game processing program. For example, messages of the virtual character are displayed sequentially from the message in the root node with reference to the chat data 28*b* defined in the form of the tree structure. At the branch point of nodes, a node is selected depending on a branch condition and a message corresponding to the selected node is displayed.

In step S12, a parameter set for the player 5 may be increased or decreased depending the option selected by the player 5. As described above, the increase/decrease amount or change rate of the parameter is determined based on the change amount (for example, increase amount or decrease amount) or the change rate (increase rate or decrease rate) of the parameter determined for each option of the message. When the change amount or the change rate of the parameter is specified, the parameter data 28*d* is updated based on the specified change amount or change rate of the favorability.

Figure 7B:
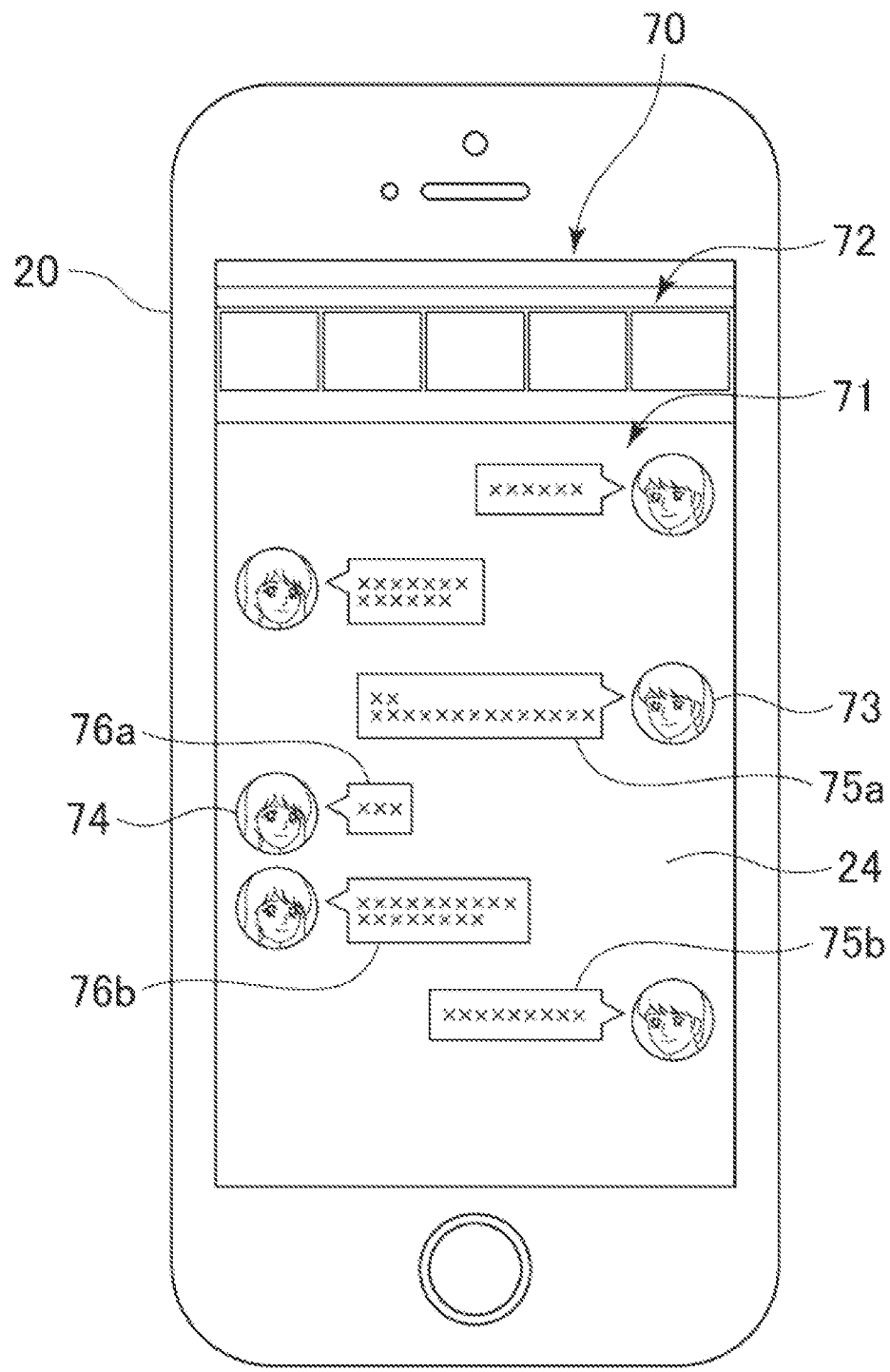
FIG. 7b shows an example of a display image in the chat mode according to an embodiment. The screen of FIG. 7b shows the message selected by the player.

The chat display image 70 in FIG. 7*a* includes a display showing options 77 of the message for the player 5 to select at the lower part of the chat display area 71. The player 5 is able to select one from among the displayed options 77. The selection is performed, for example, by touching an area where the option desired to be selected is displayed on the display 24 with a finger. Once the selection is made, a message 75*b* corresponding to the selected option is newly displayed in the chat display area 71 as a message from the player 5, as shown in FIG. 7*b*.

Figure 7C:
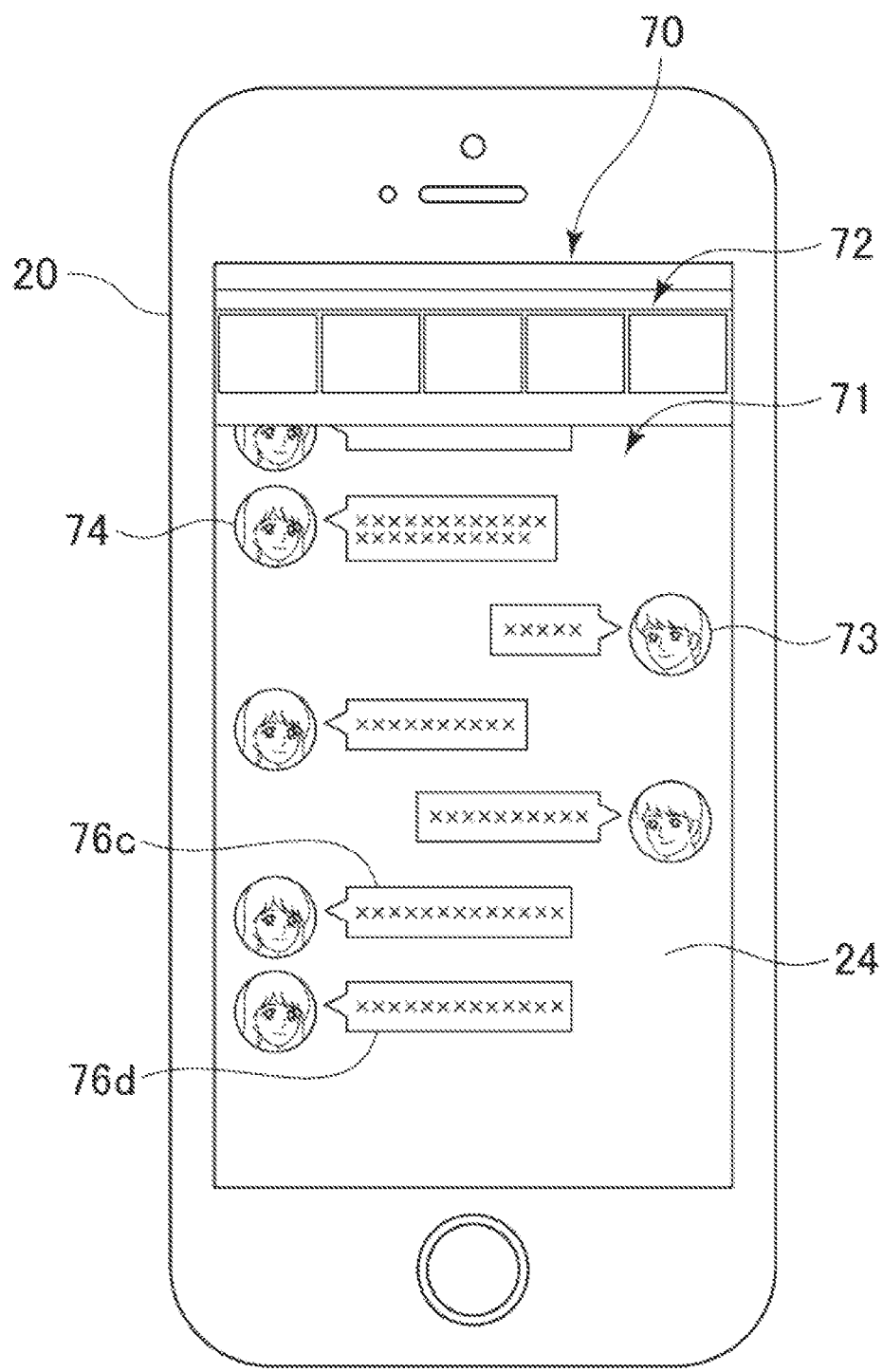
FIG. 7c shows an example of a display image in the chat mode according to an embodiment. The screen of FIG. 7c shows a message for prompting the player to switch to a VR mode, a message for selecting settings in the VR mode, and a message for selecting an item used in the VR mode.

In the course of the chat process, messages 76*c* and 76*d* for prompting the player to select settings in the second mode VR mode may be displayed as messages from the virtual character as shown in FIG. 7*c*. The message 76*c* is a message for prompting selection of a scenario in the VR mode, and the message 76*d* is a message for prompting selection of an item used by the virtual character in the VR mode (for example, clothes worn by the virtual character in the virtual space in the VR mode). In other words, the settings in the second mode include the scenario in the VR mode and the item used by the virtual character in the VR mode. After the message 76*c* prompting the selection of the scenario is displayed, choices of the scenario are displayed on the display 24. For example, first to fifth scenarios are displayed as the choices. The player 5 is able to select one scenario that he/she likes from among these choices. After the message 76*d* prompting the player 5 to select an item is displayed, choices of the item are displayed on the display 24. The player 5 can select one item that he/she likes from among the choices. In the course of a chat, a message for prompting the player to switch to the second mode may be displayed as a message from the virtual character.

In step S13, it is determined whether the mode switch condition from the first mode to the second mode is satisfied or not. An example of the mode switch condition from the first mode to the second mode is that a predetermined duration of time (for example, one minute) has elapsed from the start of the chat mode. The elapsed time from the start of chat mode is measured using, for example, a system clock. The process returns to step S12 and the chat is continued until it is determined that the mode switch condition is satisfied. When it is determined that the mode switch condition is satisfied, the chat process proceeds to step S14.

Figure 7D:
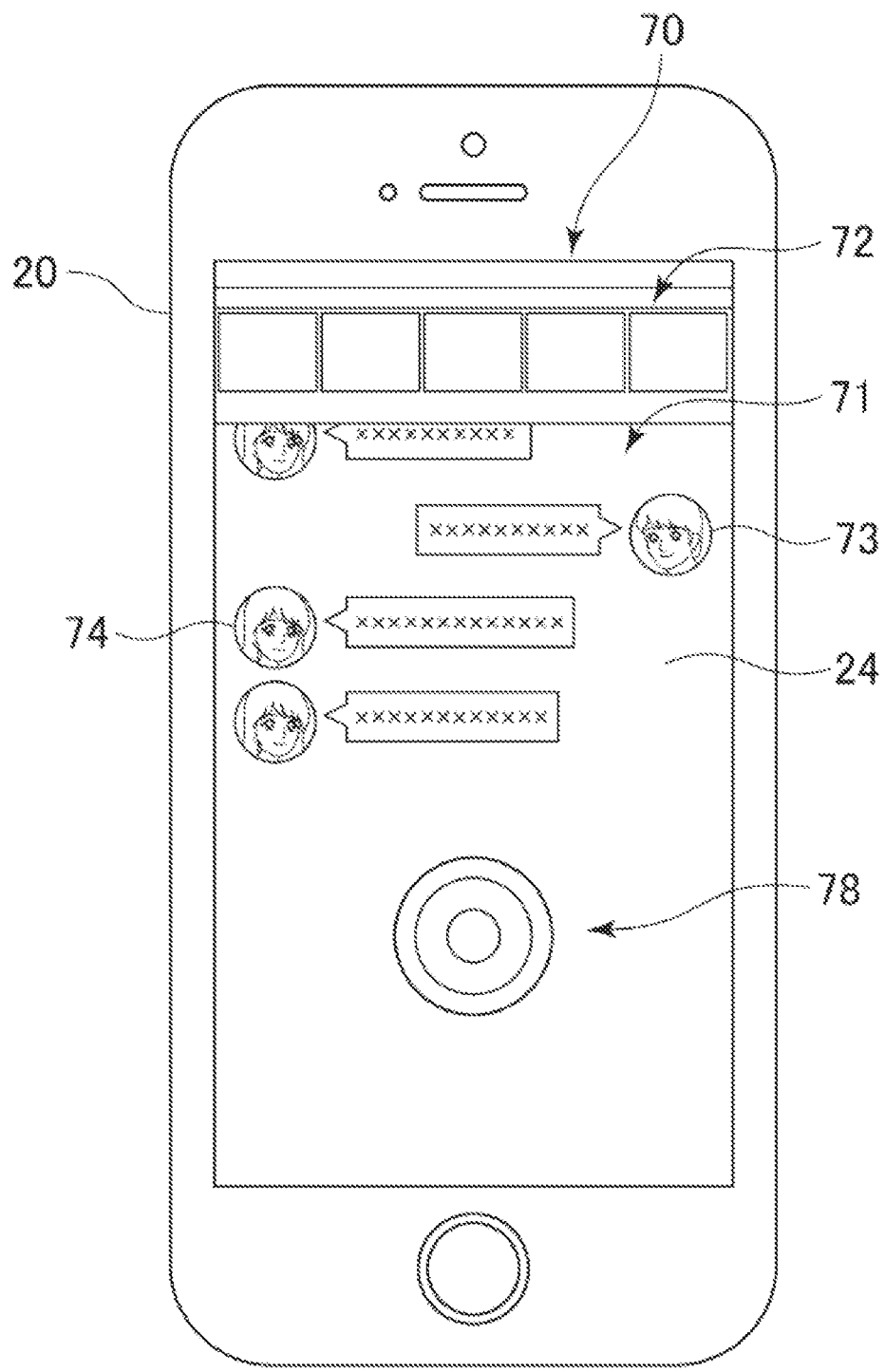
FIG. 7d shows an example of a display image in the chat mode according to an embodiment. The screen of FIG. 7d shows a switch start object.

In step S14, the switch start object 78 is displayed on the display 24, and the chat process proceeds to step S15. As shown in FIG. 7*d*, the switch start object 78 is displayed as, for example, an object having a circular profile in the chat display area 71. When it is confirmed that the switch start object 78 is selected in step S15, the chat process proceeds to step S16. Whereas when the selection of the switch start object 78 is not confirmed even after a predetermined duration of time (for example, 10 seconds) has elapsed since the switch start object 78 is displayed, it is determined that the switch start object has not been selected and the chat process is terminated. Alternatively, the process may return to step S12 and a process for resuming the chat may be performed when it is determined that the switch start object has not been selected. Whether the switch start object 78 is selected or not may be determined based on an operation performed on the touch-screen panel 24*b*. For example, when an operation (for example, a tap operation) to touch the touch-screen panel 24*b* at a position overlapping the display area of the switch start object 78 is detected via a detection signal of the touch-screen panel 24*b*, it is determined that the switch start object 78 is selected. Alternatively, the selection of the switch start object 78 may be made by a non-contact operation.

In step S16, a switch process to switch to the VR mode, which is the second mode, is started. When the switch process is started, the chat process is terminated.

The above chat process is executed by, for example, the chat mode execution unit 21*a*. The chat mode execution unit 21*a* is capable of executing the above-described chat process alone or in cooperation with other functions as appropriate. The chat process may be performed using, as required, data stored in a storage other than the storage 27, detection information obtained by various sensors, and any other data, in addition to the data stored in the storage 27.

Figure 8:
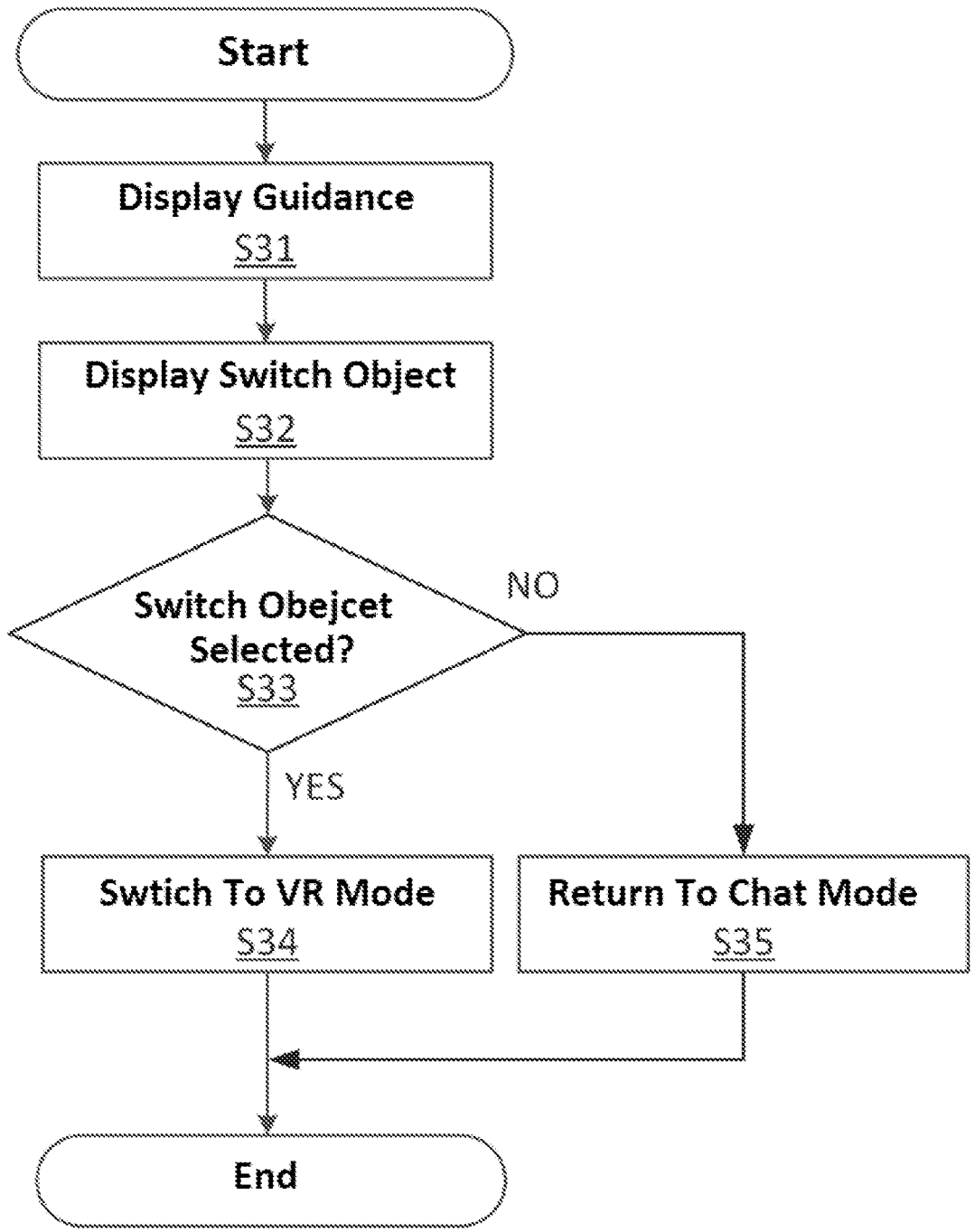
FIG. 8 is a flowchart of a mode switch process according to an embodiment.
Figure 9A:
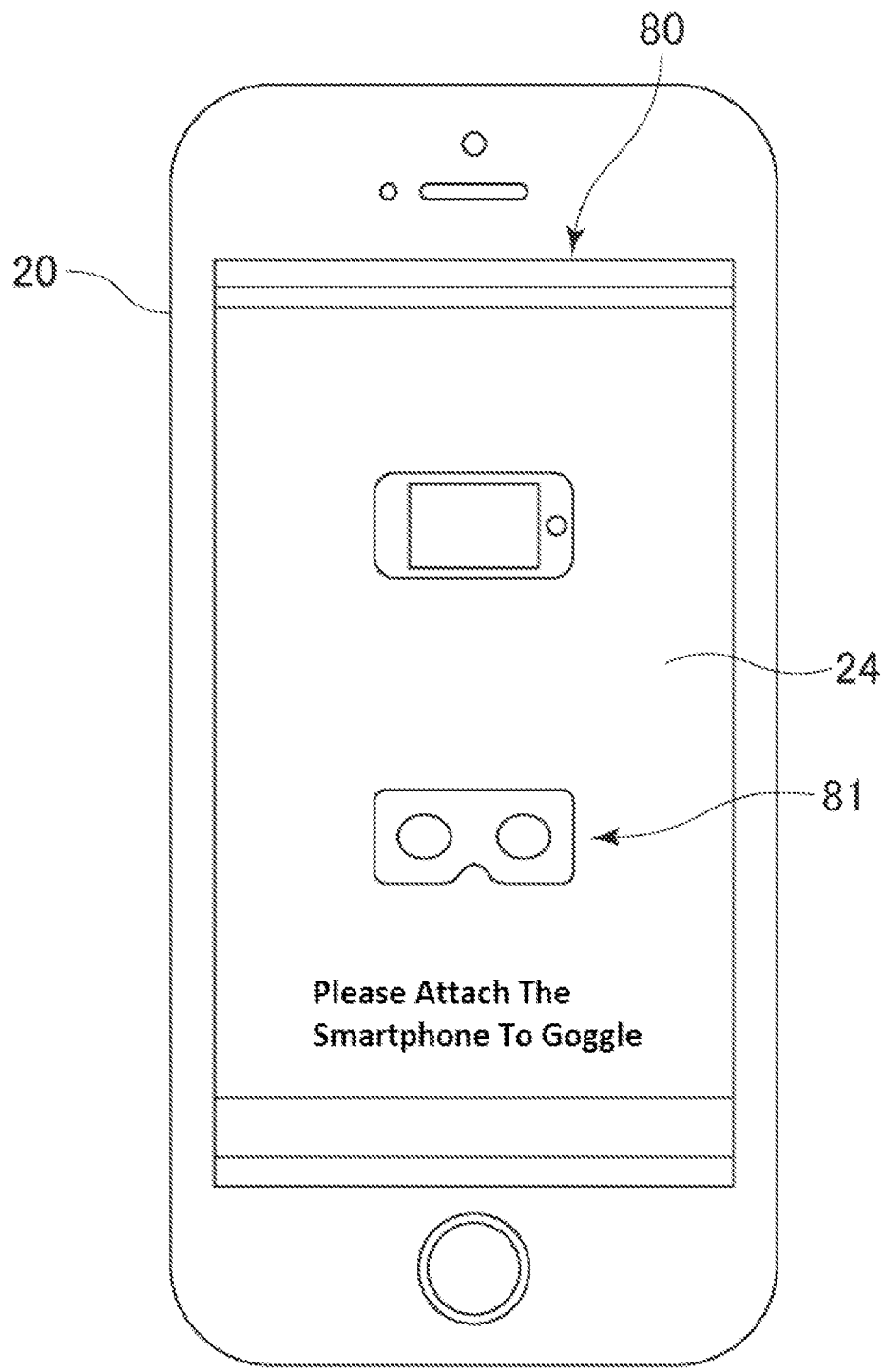
FIG. 9a shows an example of an image displayed in the mode switch process according to one embodiment. The screen of FIG. 9a shows guidance for prompting the player to attach a display to an attachment.
Figure 9B:
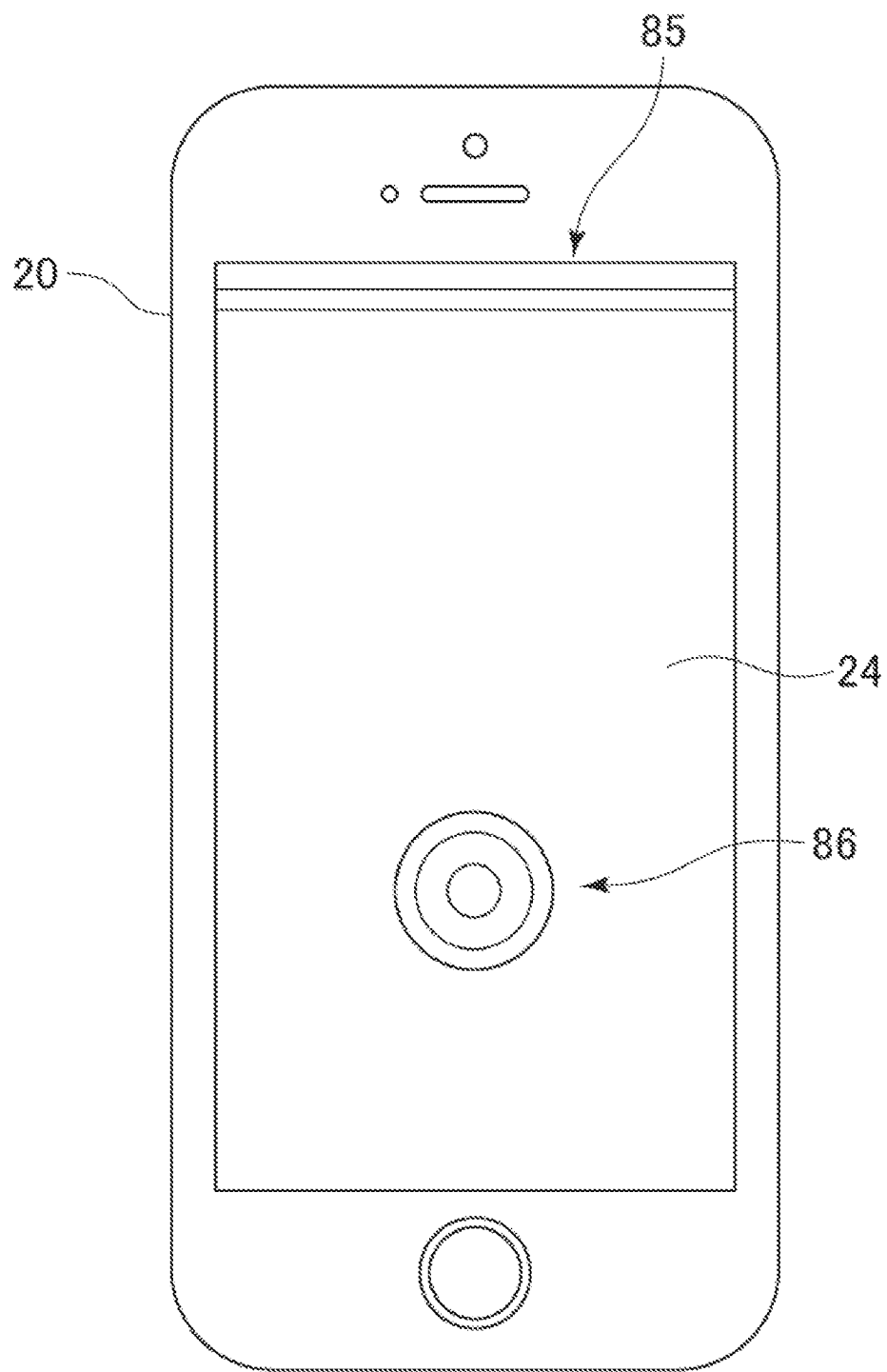
FIG. 9b shows an example of an image displayed in the switch process according to an embodiment. The screen of FIG. 9b shows a switch object.

The mode switch process from the chat mode as the first mode to the VR mode as the second mode will be now described with reference to FIG. 8 and FIGS. 9*a* and 9*b*. FIG. 8 is a flowchart of the mode switch process according to an embodiment.

When the switch process is started, a guidance that prompts the player to wear the HMD 10 is displayed on the display 24 of the information processing device 20 in step S31. A guidance display image 80 which is an example of the guidance display image including the guidance is shown in FIG. 9*a*. The guidance display image 80 may include a guidance prompting the player to attach the information processing device 20 to the attachment 11, a guidance prompting the player to wear the HMD 10 on the head, and any other various guidances necessary for starting the VR mode. The guidance display image 80 shown in FIG. 9*a* includes a guidance 81 prompting the player to attach the information processing device 20 to the attachment 11. This guidance may include instructions for attaching the information processing device 20 to the attachment 11. When a predetermined time has elapsed after displaying the guidance, the mode switch process proceeds to step S32.

In step S32, the switch object is displayed on the display 24. An example of the switch process image including the switch object is shown in FIG. 9*b*. In the switch process image 85 shown in FIG. 9*b*, a switch object 86 is included. The switch process image 85 may be displayed as a stereoscopic image. In one embodiment, the images displayed on the display 24 are switched from non-stereoscopic images to stereoscopic images at the start of the mode switch process or at a predetermined timing after the start of the mode switch process. For example, the images displayed in the chat mode are non-stereoscopic, and the images displayed after the switch process has started are stereoscopic.

Next, in step S33, it is determined whether selection of the switch object 86 is completed. The switch object 86 is selected, for example, by the player 5 gazing at the switch object 86 for a predetermined duration of time. Therefore, in order to select the switch object 86 in this state, the player 5 is required to wear the HMD 10. In one embodiment, whether the selection of the switch object 86 is completed is determined based on whether the gazing point calculated based on the detection signal from the HMD 10 is situated on the switch object 86 for a predetermined amount of time or more. The gazing point may be calculated based on information obtained by the sensor unit 25 provided in the HMD 10 as described above. The above determination can be made by measuring a gazing time for which the gazing point stays on the switch object 86 using the system clock and determining whether the measured gazing time has reached the predetermined amount of time. For example, when the gazing time reaches the predetermined amount of time, it is determined that selection of the switch object 86 is completed, and the mode switch process proceeds to step S34. When completion of the selection of the switch object 86 is not detected even after a predetermined amount of time has elapsed since the switch object 86 is displayed, it is determined that the selection of the switch object 86 has not been completed, and the mode switch process proceeds to step S35.

In step S34, the VR mode, which is the second mode, is initiated. Processes performed in the VR mode will be described later in detail.

When the switch to the VR mode has not been selected, a process for returning to the chat mode is started in step S35. When the returning process to the chat mode is completed, the chat mode is resumed. In the resumed chat mode, a message from the virtual character based on the fact that the switch to the VR mode was not performed may be displayed.

The mode switch process described above is executed, for example, by the switch processing unit 21b. The switch processing unit 21b is capable of executing the mode switch process alone or in cooperation with other functions as needed.

Figure 10:
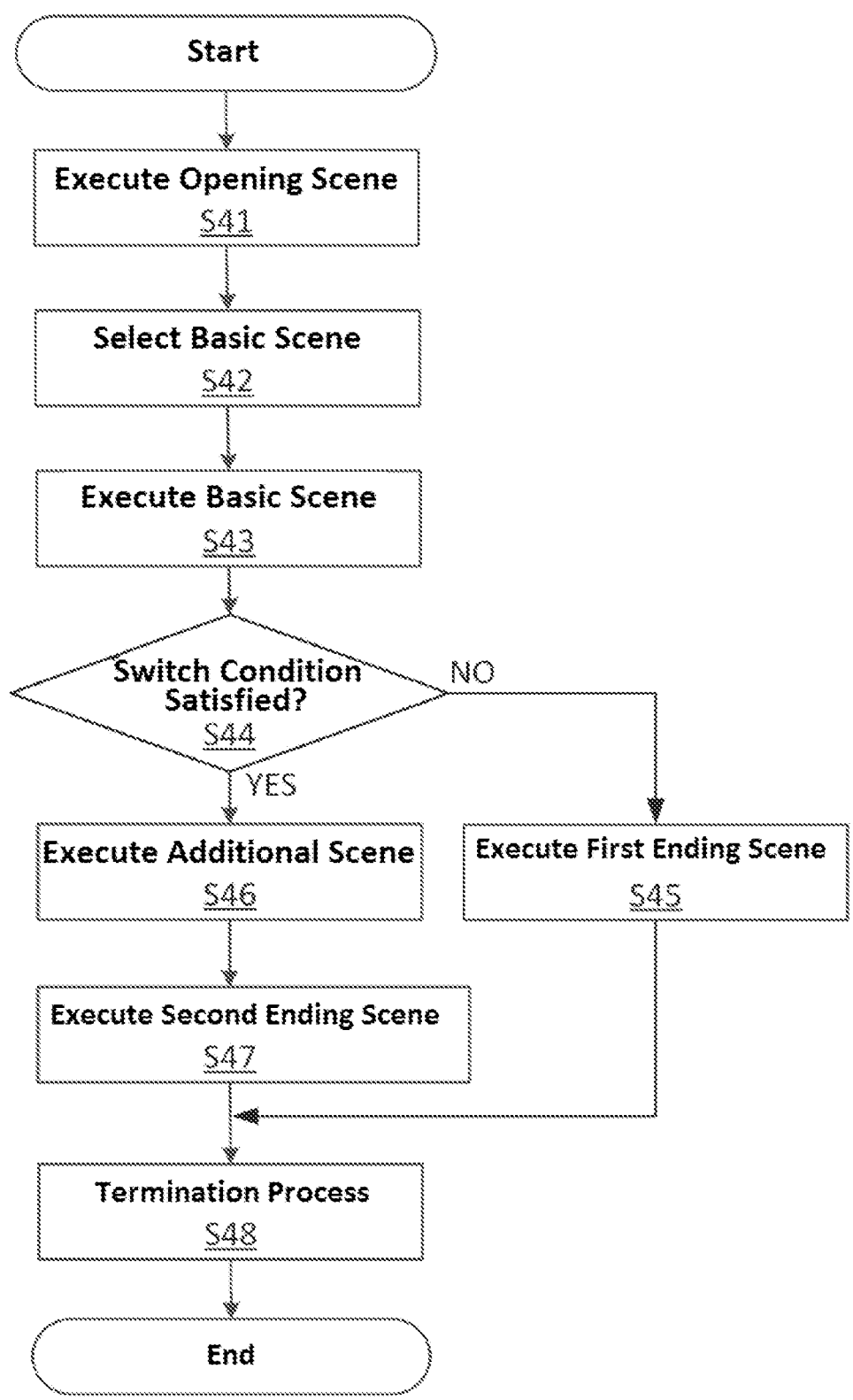
FIG. 10 is a flowchart of a process in a VR mode according to an embodiment.
Figure 11:
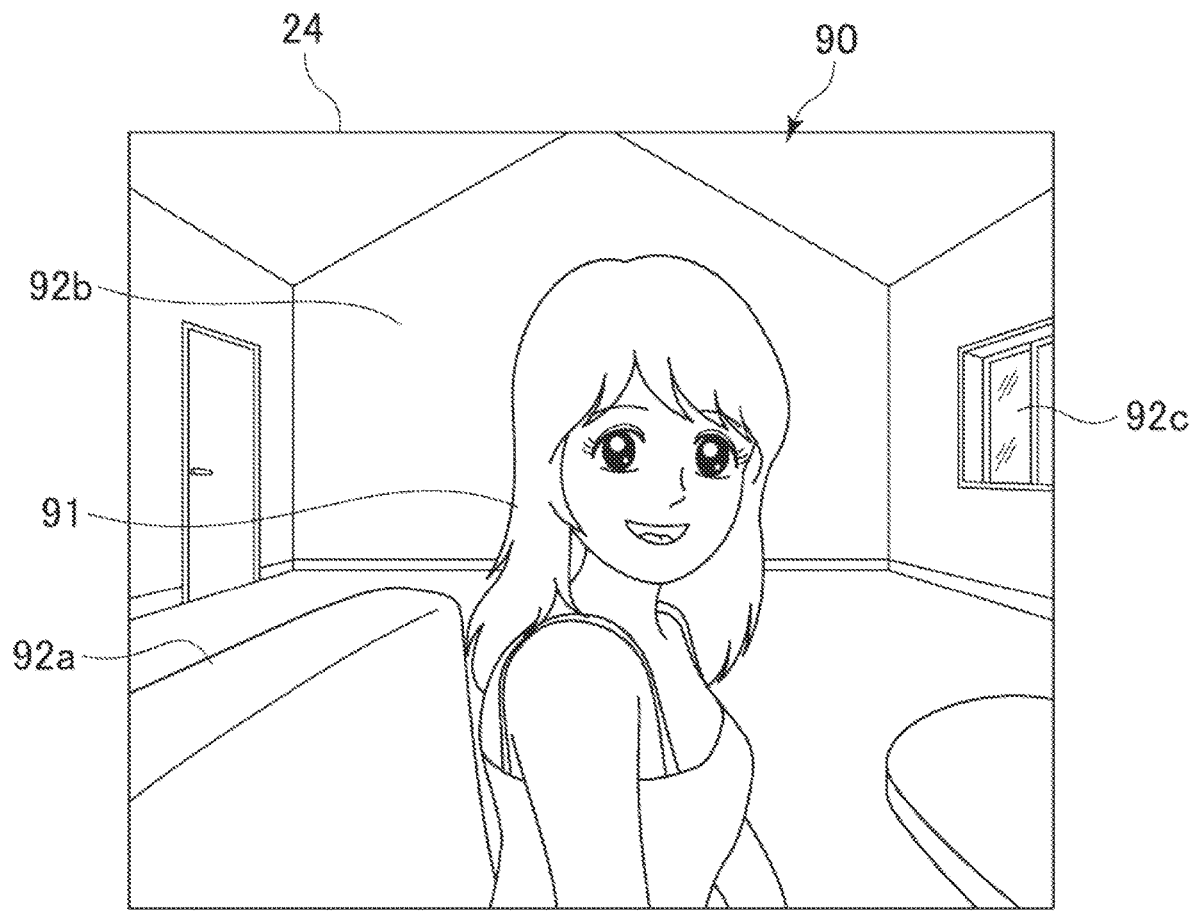
FIG. 11 shows an example of an image displayed in the VR mode according to an embodiment.
Figure 12:
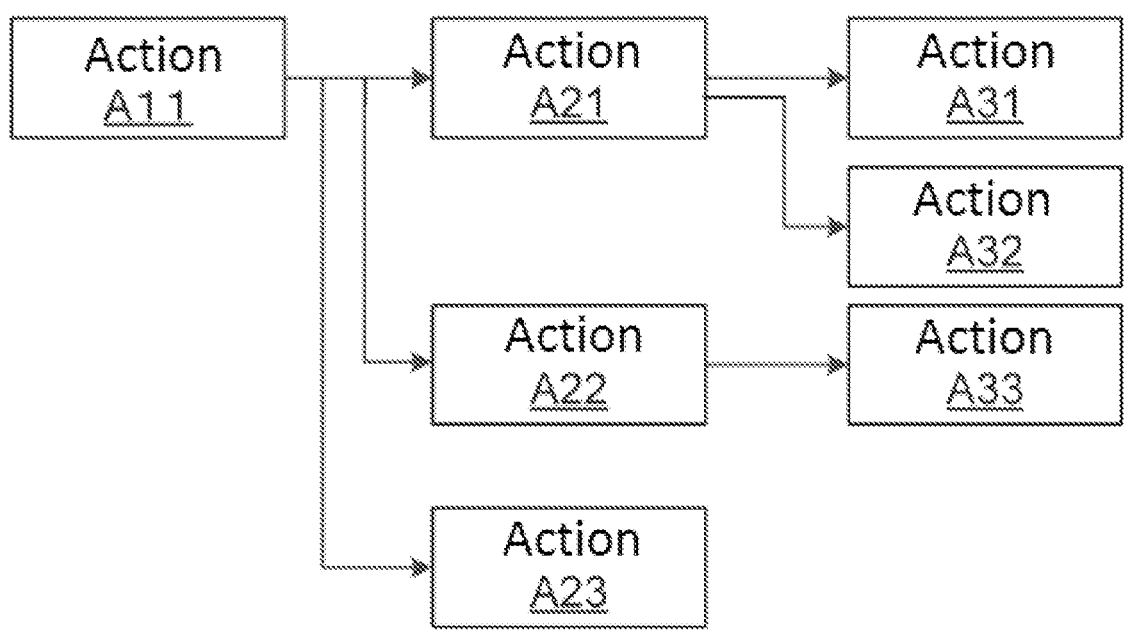
FIG. 12 schematically shows a flow of actions taken by a virtual character in a scene executed in the VR mode.

Next, a VR process in the VR mode will be described with reference to FIGS. 10 to 12. FIG. 10 is a flowchart showing the flow of the VR process in the VR mode in one embodiment, FIG. 11 shows an example of a display image in the VR mode, and FIG. 12 schematically illustrates the flow of actions of the virtual character in a scene being executed in the VR mode. As described above, in order to select the switch object 86 in the mode switch process, the player 5 wears the HMD 10. It is assumed that the HMD 10 is mounted on the head of the player 5 at the start of the VR mode. In the following, the VR process will be described on the premise that the first scenario is selected. In the VR process, the parameter data 28d is referred to when necessary. In one embodiment, the value of each game parameter included in the parameter data 28d as of the start of the VR process is equal to the value of the corresponding game parameter included in the parameter data 28d as of the end of the chat process. That is, in one embodiment, the parameter data 28d updated in the chat process is used without modification in the VR process.

When the VR mode is started, the opening scene is executed in step S41. More specifically, image information of the virtual space corresponding to the opening scene is generated, and an image according to the image information is output to the display 24. In the opening scene, a predetermined action of the virtual character may be performed in the virtual space.

FIG. 11 shows an example of a VR image of the opening scene displayed on the display 24. The VR image 90 shown in FIG. 11 includes a virtual character image 91 representing the virtual character, images 92a to 92c representing objects constituting the background, and other images of various objects. The VR image 90 is an image corresponding to a predetermined range of the virtual space for the first scenario. The range of the virtual space corresponding to the VR image 90 may be specified as a range determined by an angle of view around the gazing point in the virtual space calculated based on the orientation of the HMD 10. The image data 28a is used to generate the image information. The VR image 90 and other images displayed in the VR mode are displayed as stereoscopic images.

For example, the virtual character image 91 is able to take an action specified by opening scene data A1 in the virtual space. For example, the action that the virtual character image 91 performs may include talking to the player 5 (toward the position of the player 5 in the virtual space), traveling in the virtual space, picking up an object placed in the virtual space, and any other various actions in the virtual space.

A series of actions performed by the virtual character in the opening scene will be described with reference to FIG. 12. FIG. 12 schematically illustrates a flow of the actions taken by the virtual character in a scene executed in the VR mode. FIG. 12 illustrates the flow of actions in the opening scene. As shown in FIG. 12, the virtual character first performs an action corresponding to an action A11 in the opening scene. The action A11 corresponds to an action that the virtual character can perform in the opening scene. For example, the action A11 is an action of the virtual character talking to a character in the virtual space.

The action A11 is defined as an action that may branch. More specifically, the action A11 branches to an action A21, an action A22, and an action A23. For example, in the action A11, a first switch condition for switching to the action A21, a second switch condition for switching to the action A22, and a third switch condition for switching to the action A23 are set. When the first switch condition is satisfied, the action of the virtual character is switched to the action A21. When the second switch condition is satisfied, the action of the virtual character is switched to the action A22. When the third switch condition is satisfied, the action of the virtual character is switched to the action A23. At least one of the first, second, and third switch conditions may be that the virtual character's favorability to the user character is equal to or greater than a predetermined threshold value.

Various conditions may be set as the first switch condition, the second switch condition, and the third switch condition. For example, the first switch condition, the second switch condition, and the third switch condition may include that the action prescribed as action A11 has ended, that the player 5 performs a predetermined action (for example, the player 5 gazes at a predetermined part of the virtual character) to the virtual character, and that the player 5 answers a question from the virtual character. The first switch condition, the second switch condition, and the third switch condition are different from each other. The player 5 can answer the question from the virtual character by nodding, shaking his/her head, or other head motions. More specifically, when a question is made by the virtual character and the player makes action by moving his/her head, the movement of the head is detected by the sensor unit 25 of the HMD 10 and the answer of the player 5 is identified based on the detected movement of the head. For example, when a nodding motion is detected, it may be determined that the player 5 has made a positive answer. Whereas when a motion of shaking his/her head is detected, it may be determined that the player 5 has made a negative answer. Further, when a motion of the head of the player 5 is not detected for a predetermined duration of time after the question is made by the virtual character, it may be determined that the player 5 does not answer the question from the virtual character. The action of the player 5 may be determined by a function of the action determination unit 21c3.

The action A21 further branches to an action A31 and an action A32. When a predetermined switch condition is satisfied in the action A21, switching from the action A21 to the action A31 or the action A32 is performed depending on the established switch condition. Only the action A33 is associated with the action A22 in the lower layer. That is, the action A22 is not branched. In this case, when the action A22 ends, the action A33 is started. No more action is defined below the action A23. The structure of the actions shown in FIG. 12 is an example, and the types and the number of actions included in each scene and the structure of the actions may be set appropriately according to a story to be realized in the scene.

The switch from one action to another action may be performed seamlessly so that the player 5 does not perceive the action switch.

While the actions A11, A21 to A23, and A31 to A33 are executed, the player 5 can take actions responsive to the virtual character by gazing at a predetermined part of the virtual character or any other method. In response to the action of the player 5 taken for the virtual character, the virtual character can take a reaction determined based on the start scene data A1. The virtual character may be controlled to make a reaction in accordance with the favorability. For example, for the same action of the player 5, a friendly reaction may be made when the favorability is high, and an unfriendly reaction may be made when the favorability is low.

When the action A31, the action A32, the action A33 in the terminal layer, or the action A23 ends, the opening scene is ended and the VR process proceeds to step S42.

In step S42, the basic scene to be executed is selected from among a plurality of possible basic scenes. Selection of the basic scene to be executed is performed from among a plurality of possible basic scenes prepared for the first scenario, for example, according to the parameter data 28d. In the first scenario, three basic scenes corresponding to the basic scene data B1 to B3 illustrated in FIG. 4 are provided. In one embodiment, the basic scene to be executed is selected from among these three basic scenes based on the virtual character's favorability to the player 5, the favorability is stored as the parameter data 28d. For example, when the favorability is equal to or higher than a first threshold value, the basic scene corresponding to the basic scene data B1 is selected. When the favorability is lower than a second threshold value, the basic scene corresponding to the basic scene data B3 is selected. When the favorability is equal to or higher than the second threshold value and lower than the first threshold value, the basic scene corresponding to the basic scene data B2 is selected. Selection of the basic scene may be performed by any other method other. For example, the basic scene may be randomly selected. The basic scene may be randomly selected after performing weighting of the possible basic scenes so that the probability that some basic scene(s) (for example, the first basic scene corresponding to the basic scene data B1) are selected becomes higher as the favorability is higher. The method of selecting the basic scene is not limited to the method explicitly described in the specification. Once the basic scene is selected, the VR process proceeds to step S43.

In step S43, the basic scene selected in step S42 is executed. More specifically, image information of the virtual space corresponding to the basic scene is generated, and an image corresponding to the image information is output to the display 24. In the basic scene, the virtual character may take a prescribed action in the virtual space. As with the opening scene, the action which the virtual character takes in the basic scene may be defined as a series of branchable actions. A series of branchable actions in the basic scene may have a data structure similar to the data structure shown in FIG. 12. When the action situated in the bottom layer in the series of actions is completed, the basic scene ends and the VR process proceeds to step S44.

In step S44, it is determined whether the condition for switching to the additional scene set for the basic scene executed in step S43 is satisfied. In the determination, the condition for switching to the additional scene included in the basic scene data (for example, the basic scene data B1) corresponding to the basic scene executed in step S43 is retrieved from the storage 27, and it is determined whether the condition is satisfied in the basic scene executed in step S43. For example, when the switch condition is that the player gazes at an object representing a door in the virtual space for more than three seconds, counted is the duration of time in which the gazing point of the player 5 in the virtual space is located on the object representing the door, and it is determined that the switch condition is satisfied when the counted time is three seconds or longer. The gazing point of the player 5 in the virtual space is calculated on the basis of the orientation of the HMD 10 calculated based on the detection information from the sensor unit 25. The condition for switching to the additional scene may or may not be explicitly presented to the player 5 at the time of execution of the basic scene. For example, in the basic scene, the virtual character may speak to the player 5 the line corresponding to the condition for switching to the additional scene.

When it is determined that the switch condition is not satisfied, the VR process proceeds to step S45, whereas when it is determined that the switch condition is satisfied, the VR process proceeds to step S46.

In step S45, a first ending scene is executed. More specifically, image information of the virtual space corresponding to the additional scene is generated, and an image corresponding to the image information is output to the display 24.

In step S46, an additional scene is executed. More specifically, image information of the virtual space corresponding to the additional scene is generated, and an image corresponding to the image information is output to the display 24. Similarly to the opening scene, the action that the virtual character takes in the additional scene may be defined as a series of branchable actions. A series of branchable actions in the additional scene may have a data structure similar to the data structure shown in FIG. 12. When the action situated in the bottom layer in the additional scene is completed, the additional scene ends and the VR process proceeds to step S47.

In step S47, a second ending scene is executed. More specifically, image information of the virtual space corresponding to the second ending scene is generated, and an image corresponding to the image information is output to the display 24. The image displayed in the second ending scene may be the same as or different from the image displayed in the first ending scene.

When movement of the head of the player 5 is detected by the sensor unit 25 of the HMD 10 while the VR image 90 is displayed on the display 24, an action of the player 5 is specified based on the detected movement of the head. Then, an action (reaction) of the virtual character responsive to the specified action of the player 5 is determined. Subsequently image information of the virtual character image 91 that performs the determined action is generated. The image information generated in this way is output to the display 24. For example, when a nodding motion of the player 5 is detected, image information of the virtual character image 91 reacting to the nodding motion of the player 5 is generated, and the image information is displayed on the display 24. In this manner, in the VR mode, interaction between the player 5 and the virtual character is realized using the stereoscopic image of the virtual character.

In the above-described steps S41, S43, S45 to S47, the parameter(s) set for the player 5 may be increased or decreased according to the action(s) of the player 5. As described above, the increase/decrease amount or change rate of the parameter may be determined based on the change amount (for example, increase amount or decrease amount) or the change rate (increase rate or decrease rate) of the parameter determined for each type of the action of the player 5. When the change amount or the change rate of the parameter is specified, the parameter data 28*d* is updated based on the specified change amount or change rate of the favorability.

In step S48, the termination process of the VR mode is performed. The termination process may include displaying on the display 24 a guidance for prompting the player to remove the information processing device 20 from the attachment 11, and displaying a login screen to log in to the chat mode which is the first mode.

The above VR process is executed by the VR mode execution unit 21*c*. The VR mode execution unit 21*c* is capable of executing the VR process alone or in cooperation with other functions as needed.

Figure 13:
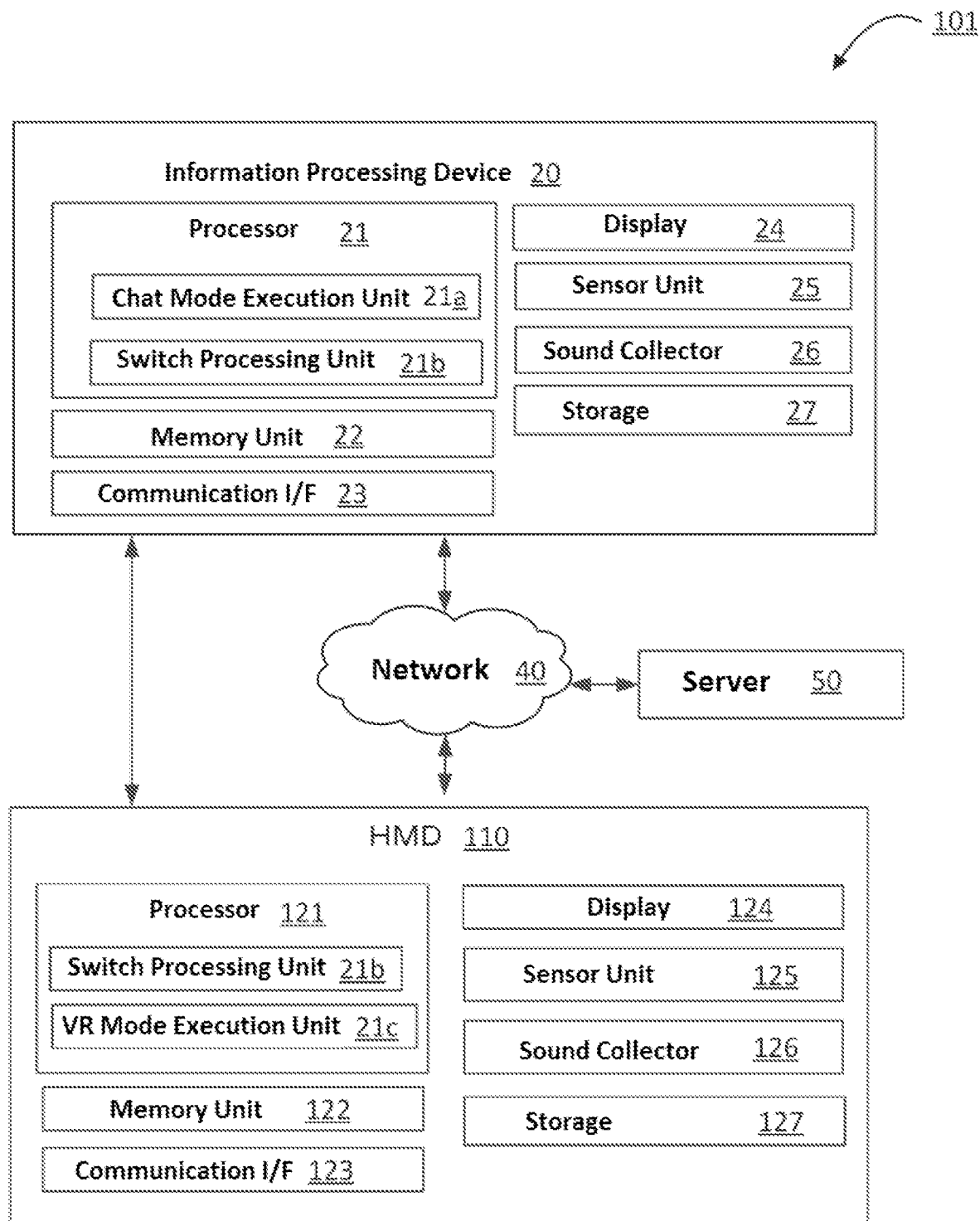
FIG. 13 is a block diagram illustrating a game processing system according to another embodiment.

The game processing system according to another embodiment will be described with reference to FIG. 13. FIG. 13 is a block diagram illustrating a game processing system 101 according to another embodiment. The game processing system 101 includes the information processing device 20 and the HMD 110. The game processing system 101 is different from the game processing system 1 in that the VR mode can be provided without attaching the information processing device 20 to the HMD 110. Hereinafter, the game processing system 101 will be described focusing on the differences from the game processing system 1.

The HMD 110, the information processing device 20, and the server 50 are communicably interconnected over the network 40. The HMD 110 and the information processing device 20 may be connected so as to communicate with each other according to a short-range wireless system such as Bluetooth (registered trademark) without using the network 40. The HMD 110 is different from the HMD 10 of the game processing system 1 in that the VR mode can be provided even if the information processing device 20 is not mounted.

The HMD 110 includes a computer processor 121, a memory unit 122, a communication I/F 123, a display 124, a sensor unit 125, a sound collector 126, and a storage 127. The computer processor 121, the memory unit 122, the communication I/F 123, the display 124, the sensor unit 125, the sound collector 126, and the storage 127 are configured similarly to the computer processor 21, the memory 22, the communication I/F 23, the display 24, the sensor unit 25, the sound collector 26, and the storage 27 of the information processing device 20, respectively. However, the display 124 may not have a touch-screen panel.

The functions of the chat mode execution unit 21*a*, the switch processing unit 21*b*, the VR mode execution unit 21*c*, and the parameter management unit 21*d* are distributed between the information processing device 20 and the HMD 110. Specifically, the function of the chat mode execution unit 21*a* is realized in the information processing device 20, and the function of the VR mode execution unit 21*c* is realized in the HMD 110. A part of the function of the switch processing unit 21*b* is realized by the information processing device 20, and the rest is realized in the HMD 110. The function of the parameter management unit 21*d* is realized by both the information processing device 20 and the HMD 110.

The image data 28*a*, the chat data 28*b*, the scenario data 28*c*, the parameter data 28*d*, and the game progress data 28*e* are stored in one or both of the storage 27 and the storage 127. Alternatively these data may be stored in a storage other than the storage 27 and the storage 127.

When starting the game in the game processing system 101, the player 5 uses the information processing device 20 to start the chat mode. The process for executing the chat mode is performed by the chat mode execution unit 21*a* of the information processing device 20.

When the mode switch condition is satisfied in the chat mode and the switch start object is selected, the mode switch process for switching to the VR mode is started. The mode switch process is performed by the switch processing unit 21*b*. In the mode switch process, displaying the guidance corresponding to the above-described step S31 is performed in the information processing device 20. For example, a guidance prompting the player to put on the HMD 110 is displayed on the display 24 of the information processing device 20. Displaying the switch object 86 corresponding to step S32 and subsequent processes are executed in the HMD 110.

When the VR mode is started, the processing of the VR mode is performed by the VR mode execution unit 21*c* of the HMD 110.

According to the above embodiments, the following advantageous effects can be obtained. With the game processing system 1, 101, it is possible to play a game in the first mode (for example, the chat mode) without using the HMD 10. The game parameters such as the favorability updated in the first mode are used also in the second mode (for example, the VR mode). This makes it possible to play the game in the first mode when the HMD 10 is not usable and to play the game in the second mode when the HMD 10 is usable.

With the game processing system 1, 101, the game parameters stored in the storage 27 are updated in accordance with progress of the game, and different scene are executed in accordance with the updated game parameters.

Embodiments of the present invention are not limited to the above embodiments but various modifications are possible within a spirit of the invention. For example, some or all of the functions executed by the computer processor 21 and the computer processor 121 may be realized by a computer processor which is not shown in the above-mentioned embodiment without departing from the scope of the invention. For example, the game processing system 1 and the game processing system 101 may include a game machine that executes at least a part of the game processing program. Some of the functions realized by processing of the computer processor 21 or the computer processor 121 may be realized by processing performed by the game machine.

Embodiments of the disclosure may include various devices and electronic components other than those described above. For example, in addition to the information processing device 20 and the HMD 10, 110, the game processing system 1 and the game processing system 101 may be provided with a control device for receiving operations of the player 5. The game processing system 1 and the game processing system 101 may detect operations of the player 5 via the control device and perform the processing of the game in accordance with the detected operations.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. A game processing system for processing a game having a first mode and a second mode, the system comprising:
   a storage storing a game parameter relating to the game; and
   one or more computer processors, wherein the one or more computer processors execute computer-readable instructions to:

provide, in the first mode, an interaction with a virtual character in accordance with first detection information obtained by an information processing device not mounted on a head of a player;

provide, in the second mode, an interaction with the virtual character in accordance with second detection information obtained by a head mounted display mounted on the head of the player;

update the game parameter in accordance with progress of the game in the first mode; and update the game parameter in accordance with progress of the game in the second mode, wherein a game item is used both in the first mode and in the second mode.

2. The game processing system of claim 1, wherein an action of the virtual character in the second mode is determined in accordance with the game parameter.

3. The game processing system of claim 1, wherein
the storage stores scene data relating to each of a plurality of game scenes constituting a game scenario in the second mode, and
the one or more computer processors select a scene to be executed in the second mode from the plurality of game scenes in accordance with the game parameter.

4. The game processing system of claim 1, wherein the one or more computer processors update the game parameter when the second mode is terminated abnormally.

5. The game processing system of claim 1, wherein the one or more computer processors performs a switch process to switch from the first mode to the second mode such that a value of the game parameter as of an end of the first mode is equal to a value of the game parameter as of a start of the second mode.

6. The game processing system of claim 1, wherein the game item is used by the virtual character in the second mode.

7. The game processing system of claim 1, wherein the game parameter is updated responsive to performance by the player of a predetermined inappropriate action in the second mode.

8. The game processing system of claim 1, wherein the game parameter is a player character parameter relating to a player character used by the player.

9. The game processing system of claim 1, wherein the game parameter is changed responsive to either one or both of switching from the first mode to the second mode and switching from the second mode to the first mode.

10. The game processing system of claim 1, wherein the game parameter is updated responsive to a first action by the player in the first mode.

11. The game processing system of claim 1, wherein the game parameter is updated responsive to a second action by the player in the second mode.

12. The game processing system of claim 1, wherein a game item parameter is associated with the game item,
wherein the game item parameter is updated in accordance with progress of the game in the first mode; and
wherein the game item parameter is updated in accordance with progress of the game in the second mode.

13. The game processing system of claim 1, wherein a game item parameter is associated with the game item,
wherein the game item parameter is changed responsive to either one or both of switching from the first mode to the second mode and switching from the second mode to the first mode.

14. A method of processing a game having a first mode and a second mode with one or more computer processors executing computer-readable instructions, the method comprising:

providing, in the first mode, an interaction with a virtual character in accordance with first detection information obtained by an information processing device not mounted on a head of a player;

providing, in the second mode, an interaction with the virtual character in accordance with second detection information obtained by a head mounted display mounted on the head of the player;

updating a game parameter relating to the game in accordance with progress of the game in the first mode; and updating the game parameter in accordance with progress of the game in the second mode, wherein a game item is used both in the first mode and in the second mode.

15. A non-transitory computer-readable storage medium storing a game processing program to be executed by one or more computer processors for processing a game having a first mode and a second mode, wherein the game processing program causes the one or more computer processors to:

provide, in the first mode, an interaction with a virtual character in accordance with first detection information obtained by an information processing device not mounted on a head of a player;

provide, in the second mode, an interaction with the virtual character in accordance with second detection information obtained by a head mounted display mounted on the head of the player;

update a game parameter relating to the game in accordance with progress of the game in the first mode; and update the game parameter in accordance with progress of the game in the second mode, wherein a game item is used both in the first mode and in the second mode.

* * * * *